US010678842B2

(12) United States Patent
VanderLugt et al.

(10) Patent No.: US 10,678,842 B2
(45) Date of Patent: Jun. 9, 2020

(54) GEOSTORY METHOD AND APPARATUS

(71) Applicant: EarthX, Inc., San Francisco, CA (US)

(72) Inventors: Kyle VanderLugt, San Bruno, CA (US); Joshua Willis, Oakland, CA (US); Thomas Gaskins, Seattle, WA (US); Dean Addison, Shawnigan Lake (CA); Jeffery Addison, Shawnigan Lake (CA)

( * ) Notice: Subject to any disclaimer, the term of this patent is extended or adjusted under 35 U.S.C. 154(b) by 370 days.

(21) Appl. No.: 15/829,848

(22) Filed: Dec. 1, 2017

(65) Prior Publication Data

US 2018/0276221 A1 Sep. 27, 2018

Related U.S. Application Data

(63) Continuation-in-part of application No. 15/679,065, filed on Aug. 16, 2017, which is a
(Continued)

(51) Int. Cl.
*G06F 16/44* (2019.01)
*G06T 15/04* (2011.01)
(Continued)

(52) U.S. Cl.
CPC ........ *G06F 16/444* (2019.01); *G06F 3/04815* (2013.01); *G06F 16/29* (2019.01);
(Continued)

(58) Field of Classification Search
None
See application file for complete search history.

(56) References Cited

U.S. PATENT DOCUMENTS 6,278,432 B1 8/2001 Ratnakar
6,618,053 B1 9/2003 Tanner
(Continued)

FOREIGN PATENT DOCUMENTS

WO 1998/038561 9/1998
WO 2005/094466 10/2005
WO 2007/070358 6/2007

*Primary Examiner* — Cai Y Chen
(74) *Attorney, Agent, or Firm* — Klintworth & Rozenblat IP LLP

(57) ABSTRACT

A method in a geostory system is disclosed for retrieving one or more geostory elements from one or more corresponding geostory databases, the one or more geostory elements defining, at least in part, a geostory program, each of the one or more geostory elements having an associated description. The method further includes a geosystem organization system assembling, with an organization, the retrieved one or more geostory elements into a geostory organizational schema, the geostory organizational schema defining a sequence and order of distinct types of potentially overlapping geostory elements and the sequence defining an order in which the one or more geostory elements are executed when playing the geostory. While assembling the retrieved one or more geostory elements into the geostory organizational schema, the assembled one or more geostory elements are automatically translated and the translated one or more geostory elements are added to a geostory description language to generate the geostory program.

20 Claims, 26 Drawing Sheets

Related U.S. Application Data continuation-in-part of application No. 15/465,474, filed on Mar. 21, 2017.

(51) Int. Cl.
  *G06T 17/05* (2011.01)
  *G06F 3/0481* (2013.01)
  *G06F 16/29* (2019.01)
  *G09B 5/12* (2006.01)

(52) U.S. Cl.
  CPC .............. *G06T 15/04* (2013.01); *G06T 17/05* (2013.01); *G09B 5/125* (2013.01); *G06T 2210/32* (2013.01)

(56) References Cited

U.S. PATENT DOCUMENTS

| | | |
|---|---|---|
| 7,158,878 B2 | 1/2007 | Rasmussen et al. |
| 7,225,207 B1 | 5/2007 | Ohazama et al. |
| 7,425,952 B2 | 9/2008 | Rybacki et al. |
| 8,543,917 B2 | 9/2013 | Ketola et al. |
| 8,665,266 B2 | 3/2014 | Vandrovec |
| 8,681,151 B2 | 3/2014 | Coombe et al. |
| 8,812,990 B2 | 8/2014 | Reponen et al. |
| 8,965,884 B2 | 2/2015 | Jones et al. |
| 9,024,947 B2 | 5/2015 | Coombe et al. |
| 9,129,428 B2 | 9/2015 | Pahwa et al. |
| 9,153,011 B2 | 10/2015 | Vorhies |
| 9,153,063 B2 | 10/2015 | Bartholomew et al. |
| 9,424,662 B2 | 8/2016 | Curungton et al. |
| 9,429,435 B2 | 8/2016 | Blumenberg et al. |
| 2008/0109159 A1 | 5/2008 | Shi et al. |
| 2010/0321399 A1 | 12/2010 | Ellren et al. |
| 2012/0221552 A1 | 8/2012 | Reponen et al. |
| 2014/0204116 A1 | 7/2014 | Maurer et al. |
| 2015/0070379 A1* | 3/2015 | Fan .................. G06T 15/08 345/594 |
| 2015/0262335 A1 | 9/2015 | Padwick et al. |
| 2015/0356088 A1 | 12/2015 | Berkhin et al. |
| 2015/0370828 A1 | 12/2015 | Maurer et al. |
| 2016/0203624 A1 | 7/2016 | Anderson |
| 2018/0322143 A1* | 11/2018 | Bernard ............. G01C 21/3667 |

* cited by examiner

GEOSTORY METHOD AND APPARATUS

CROSS REFERENCE TO RELATED APPLICATIONS

This application is a continuation-in-part of U.S. patent application Ser. No. 15/679,065, filed on Aug. 16, 2017, by Kyle Vanderlugt et al. and entitled "NON-RESOLUTION MAP TILING A GEOSPATIAL MAPPING SYSTEM", which is a continuation-in-part of U.S. patent application Ser. No. 15/465,474, filed on Mar. 21, 2017, by Kyle Vanderlugt et al., and entitled "A SYSTEM AND METHOD FOR RENDERING GEOSPATIAL MAPS", the disclosures of which are incorporated herein by reference as though set forth in full.

BACKGROUND

Geospatial mapping is employed in displaying a digital representation, in various forms, of the globe, space, and beyond. Attributes of such displays, such as the earth's terrain, temperature, geographic referenced economic data, and other associated characteristics, are commonly mapped on a computer or a smartphone, for instance. In the last couple of decades, particularly with the advent of the Internet, software has found numerous applications, beyond that which was even contemplated in years prior. Accordingly, with the state of current technology, for example, earth can be viewed virtually, on various devices and from a vantage point of somewhere in the space. It can be viewed in detail at selected areas upon the user zooming in or out. These are among a host of other display manipulations for mapping the globe, space, and beyond.

Multiple approaches have led to characterization of digital geospatial representation of geographic areas, points of interest, and interesting findings commonly found in geospatial maps. One such approach involves cinematic storytelling. To build a cinematic story that characterizes geospatial information such as earth terrain, temperature, economic data, and global carbon dioxide on a 3D globe, a user must create motion pathways. One method of creating cinematic pathways currently used in industry, involves using a series of still images of a digital earth as seen from space, using custom software application features available in the client device interface. Each successive still image changes in a number of ways including, height from surface of the earth, the angle of view from the surface of the earth, as well as latitude and longitude. The series of still images, when viewed in rapid succession, give the impression of viewing a continuous movement along the earth, which changes in latitude, longitude, elevation, and angle. This technique is similar to that used in motion picture development. An alternative method to creating a seamless motion along a 3D globe involves camera interpolation. In camera interpolation, a user takes two or more still image frames of the digital earth that differ in one or more parameters of latitude, longitude, elevation, and angle. The user then uses custom software application features available in the client device interface, to specify a transition pathway (e.g. linear spline, cubic spline, quadratic spline, etc. . . . ) which articulates the pathway that the camera will take between the successive still image frames. The software digital camera then records the 3D earth as specified along that transition pathway. The resulting video is a near continuous capture of the 3D earth along the motion pathway specified between the two still image frames.

In addition to creating a motion pathway, a cinematic digital story, that characterizes digital geospatial representation of areas, points of interest, and interesting findings commonly found in geospatial maps, users add voice narration, other sound files, annotations (e.g. visual text that is read on the client device interface), and other embedded rich media clips (e.g. digital videos) can be created.

One of the drawbacks of the current 3D geospatial cinematic story creation methods is that they rely on the use of static still image frames to create motion pathways. In addition, once completed, the content is saved as a specific movie file format (e.g. .avi, mp4, .flv). As a result, cinematic stories once completed, remain static fixed content and which cannot be modified. Creating 3D geospatial cinematic content has remained time consuming, highly challenging, and does not maintain current information. This greatly limits the capability to characterize digital geospatial representation of areas, points of interest, and interesting findings that may and do change over time.

SUMMARY OF VARIOUS EMBODIMENTS

A further understanding of the nature and the advantages of particular embodiments disclosed herein may be realized by reference of the remaining portions of the specification and the attached drawings.

Briefly, a method includes retrieving one or more geostory elements from one or more corresponding geostory databases, the one or more geostory elements defining, at least in part, a geostory program, each of the one or more geostory elements having an associated description. The method further includes a geosystem organization system assembling, with an organization, the retrieved one or more geostory elements into a geostory organizational schema, the geostory organizational schema defining a sequence and order of distinct types of potentially overlapping geostory elements and the sequence defining an order in which the one or more geostory elements are executed when playing the geostory. While assembling the retrieved one or more geostory elements into the geostory organizational schema, the assembled one or more geostory elements are automatically translated and the translated one or more geostory elements are added to a geostory description language to generate the geostory program.

DETAILED DESCRIPTION OF EMBODIMENTS

Figure 1:
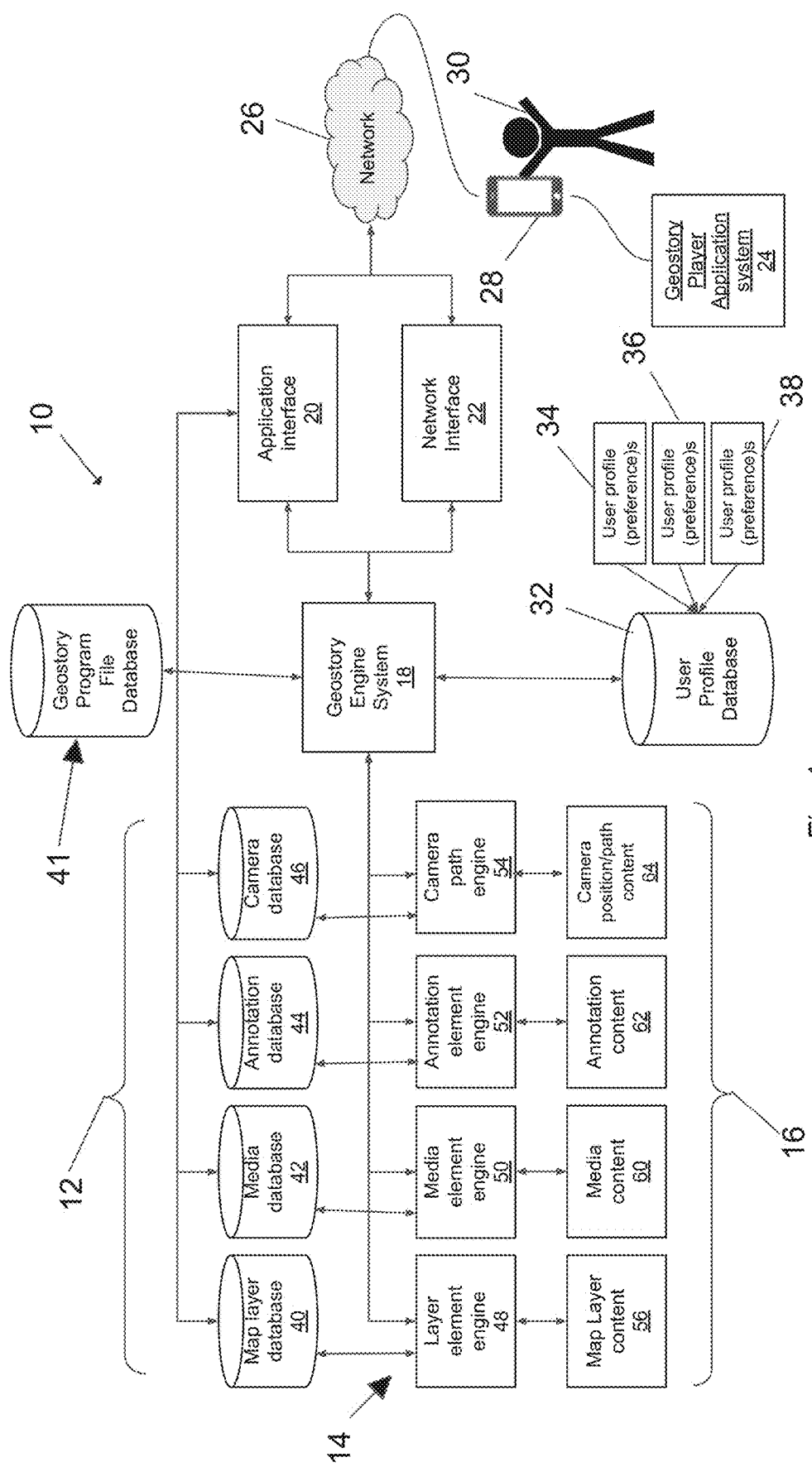
FIG. 1 shows a conceptual block diagram of some of the relevant structures of an exemplary implementation of the invention.

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of various implementations of the invention. It should be noted that the figures discussed herein are not drawn to scale and thicknesses of lines are not indicative of actual sizes.

In accordance with exemplary embodiments and methods of the invention, not only can a user create and complete a three-dimensional (3D) earth cinematic story using a motion pathway, for example, between New York and San Francisco, in order to show and explain geospatial state-wide economic disparities across the country, once completed, the user can later add additional geospatial map layers, such as geospatial population density, to further describe the geospatial relationship between population density and economics. Additionally, the cinematic story is dynamic and the information the story provides relates to current (real-time) information. As a result, creating 3D geospatial cinematic content, in accordance with various embodiments and methods of the invention, is efficient, high performance, and maintains current information. Further, memory or storage capability required to characterize digital geospatial representation of areas, points of interest, and interesting findings that may and do change over time, is not constrained.

In an exemplary implementation of the invention, an interactive programmatic geospatial content on a 3D Globe ("Geostories") includes the creation of a schema and language for defining geostories ("Story Description Language"), as well as a new system ('Story Player") capable of reading and converting the Story Description Language, contained in a digital software file, into cinematic geospatial content. The schema defines the organization and structure of the language elements that comprise a geostory. The language defines the syntax for describing the geostory elements. Together the schema and language define a geostory program (or "geostory description") which can be interpreted and executed by the geostory player as a static, streaming or dynamically generated form.

The geostory program describes the geostory (or "story") elements, the time at which they are played by a geostory player and their effect on the user client device interface display and/or client device audio function. A client device is a device, employed by a user, that includes a display for displaying images and capable of performing computations and communication, over a network. Examples of client devices, without limitation, are smartphone, tablet, computer, and the like.

In accordance with implementations of the invention, a system for playing geostories, defined by a geostory definition language, is called a geostory player. An example of the geostory player is the system 24. The geostory player interprets and executes instructions outlined in the geostory program (or "file") defined by the geostory description language which comprises the geostory (program) configuration file.

During the reading operation of the geostory program, programmatic geostory element objects are created by the geostory player and executed in sequence and in parallel to translate the geostory description on the client device display. Each geostory description element has a corresponding object written in an arbitrary programming language that causes that geostory element to affect the display and/or audio device according to the timing specified in the geostory description. One or more controllers written in an arbitrary programming language coordinate the operation of the element objects. Operation of the geostory may be stopped, restarted, reversed, accelerated or aborted by the client device at any point during the geostory. The geostory may be edited and/or published to a particular community or the community at large.

In an exemplary implementation, A method for creating geospatial story description language includes initiating the creation of a geostory (organizational) schema based on a geostory (description) language and organization of geostory elements including media elements, map layers, camera positions and pathway(s), and duration, to generate a geostory schema on a network server based on signals received from a client device that trigger the activation of creating a the geostory description file. The media elements include audio and visual content.

The steps further include searching for a plurality of map layers and media elements (and possibly annotation and camera position and pathway elements) that are associated with the geostory organizational schema in one or more databases of the network server. Upon failing to find the plurality of map layers and media elements, map layers needed for inclusion in the geostory program, are created. Upon finding the map layers and media element database, the map layers and media elements needed for inclusion in the geostory program, are identified and selected and organized into the geostory organizational schema.

Optionally, signals from the client device are received that represent at least two camera positions and at least one camera pathway, connecting the two camera positions, that in total comprise a camera pathway element. The camera pathway element is added to the geostory organizational schema. Optionally, the geostory program may be adjusted, or modified, by altering the geostory organizational schema through changing of the visual, audio, and duration properties of the geostory elements. Creation of the geostory organizational schema automatically creates the geostory (description) language. Alternatively, the geostory program may be adjusted, or modified, by editing or modifying the geostory elements independent of the geostory organizational schema in which case the geostory description language remains unchanged and the geostory element(s) are changed, or updated, at a location where the geostory elements were saved prior to the change.

In another exemplary implementation, a method for executing a geostory program includes initiating execution of a geostory player (system), saved in a (user) client device. Upon receipt of input signals and initiation of a geostory player system, in the client device, a search is conducted for the geostory file/program in the network. The geostory program, located in a geostory program database, includes the geostory description language. Upon recognition and finding of the geostory program, a geostory system engine, in the client device, deploys the geostory program to the client device.

Additionally, upon the client device receiving the geostory program, transcription and translation of the geostory description language is performed. During transcription, the geostory player creates and executes programmatic geostory element objects in sequence and parallel to the geostory elements in the geostory description language, as described in further detail relative to FIG. 26 herein. One or more element controllers, written in an arbitrary programming language, coordinate the operation of the (geostory) element objects.

The geostory element objects cause that geostory element (s) to affect the display and/or audio device of the client device, according to the timing specified in the geostory description language. The geostory player translates the geostory description language for display of the geostory (execution of the geostory program) on the client device display, including playing audio (using an audio device) into static, streaming or dynamically generated cinematic content.

In accordance with an embodiment and method of the invention, operation of the geostory may be stopped, restarted, reversed, accelerated or aborted by the client device user at any point during the geostory. Operation of a geostory may be stopped, allowing users to explore geospatial layers and media elements associated with the geostory schema before continuing the operation of a geostory program.

In yet another exemplary implementation, an interactive programmatic geospatial content is created to be displayed on a 3D Globe ("Geostories"). The interactive programmatic geospatial content includes a geostory (organizational) schema and language for defining geostories—story description language. A geostory player is capable of reading and converting the geostory description language, contained in a digital software file, into a geospatial content. The schema defines an organization and structure of the geostory elements. A group of geostory elements, collectively defining the visual and audio content of a geostory, wherein the geostory description language defines the syntax for describing the geostory elements. Together the schema and language define a geostory program (or "geostory description"), the geostory program is interpreted and executed by the geostory player as a static, streaming or in a dynamically-generated form. The geostory program describes the geostory elements, the time at which the geostory elements are played by the geostory player, and their effect on the (user) client device interface display and/or client device audio.

FIG. 1 shows a conceptual block diagram of some of the relevant structures of an exemplary implementation of the invention. A geospatial system 10 is shown to include a set of element content databases 12, a set of element engines 14, content storage 16, a geostory engine system 18, an application interface 20, a network interface 22, network 26, client device 28, and user profile database 32. Client device 28 is shown to be used by a user 30 and executes a geostory player application system 24. The user profile database 32 is shown to include user profiles 34-38. The databases 12 is shown to include a map layer database 40, media database 42, annotation database 44 and camera database 46. The set of element engines 14 is shown to include a layer element engine, media element engine 50, annotation element engine 52, and camera path engine 54.

All structures except for the client device 28 and network 26 create or use/play a geostory schema for use by the user 30. They communicate with the client device 28 through the network 26, such as the internet or intranet, Ethernet, switch, and the like.

A geostory program is comprised of geostory description language that includes the description and reference for various types of content, such as, without limitation, media elements, map layer elements, annotation elements, and camera positions as well as camera pathway elements, each of which is selectable by the user 30. The set of databases 12 includes various types of content generated by third parties or perhaps even the user 30. Content storage 16 includes various types of content saved over time by third parties or other sources. The engines 14 control the set of databases 12 and 14 and further interact with the system 18.

In an embodiment of the invention, map layers are sent through the network 26, along with tiles and data as needed. Otherwise, the elements, such as the media, annotation, and camera pathway elements, are read from the cloud, i.e. through the network 26, by the geostory player application system (also referred to herein as "geostory player) 24 as the system 24 transcribes and translates the geostory description file.

The databases 12 may be storage devices. An example of a geostory element, contained in one of the databases 12, such as the map layer database 40, is a specific map layer. An example of content contained in a component 16, such as the map layer content storage 56, is a data file containing itemized records of global temperature records. The map layer database 40, layer element engine 48, and map layer content storage 56 generally store or process map layers. For a better understanding of map layers, the reader is referred to U.S. patent application Ser. No. 15/679,065, filed on Aug. 16, 2017, by Kyle Vanderlugt et al. and entitled "NON-RESOLUTION MAP TILING A GEOSPATIAL MAPPING SYSTEM" and U.S. patent application Ser. No. 15/465,474, filed on Mar. 21, 2017, by Kyle Vanderlugt et al., and entitled "A SYSTEM AND METHOD FOR RENDERING GEOSPATIAL MAPS".

As previously noted, the database 40 typically includes map layers that are either received by the user 30 through the client device 28 or by third parties. Over time, as more map layers are built, they may be saved in storage 40 for use by other users or systems. In other words, the content saved in storage 40 may be shared by the public at large or a group of users and therefore accessible for creating desirable geostories without the necessity of having to create new map layers that may have otherwise already been created by third parties.

The system 18 is the principal engine for coordinating the production of geostory programs within the system 10 in that it not only controls the production of geostory description language but also controls when information is stored in or retrieved from the databases 12. The system 18 also controls the interaction between the engines 14 and their corresponding databases 12 as well as the storage of each of the content files in the content storage 16.

The database 32 is used to save user profile information, as desired by the user. For example, in the event the user 30 has a preference for geostory programs relating to geology or technology, such preference may be saved, for this particular user, in a corresponding user profile 34, 36, or 38 of the database 32.

The application interface 20 enables the user's client device 28 to communicate with the databases 12 through the network system 26. Accordingly, it enables communication protocols used for the transmission and receipt of information from, for instance, the geostory player application system 24 to or from the databases 12. The network protocols, by which communication signals are exchanged between the client device 28 and the components, shown to the left of the network 26 (looking into the page) of the geospatial system 10, may be re-configured through the network interface 22.

The network interface 22 serves as the configurable gateway by which information is communicated between the geostory engine system 18 and the system 24 through the network 26. For example, the network interface 22 is used to configure the communication protocols between the devices shown in FIG. 4.

During operation, in an exemplary embodiment, the user 30, employing the client device 28 with the system 24, may initiate transmission of stored media (content) from the client device 28, through the network 26 where it is stored as media content files in the storage 60.

Media content generally includes audio/visual information that either the user 30 has created through client device 28 or other means or content that is downloaded from some other source, such as for example, another network, database, or the like.

Annotation content, in the annotation element engine 52, includes annotations made by the user 30. By way of example, the user 30 may wish to add text describing or giving a title to a visual (in the media (content) element). This added text is considered an annotation. That is, as it relates to the geostory program, for example, the user 30 may type in a title or relevant information relating to a part of the media content, the layer content, or camera (pathway) content. Regarding the latter, at least two camera positions are required to form a camera pathway and a camera pathway is a pathway of interest to the user 30. For example, the user 30 may identify, using the display of the client device 28, a pathway that begins at a height of 10,000 feet, at a location generally above San Francisco, Calif., and end at a height of 5,000 feet, generally above Sydney, Australia, essentially traveling a path around the globe.

Thus, media elements (audio and video files, for example) come from multiple sources. One source is files originating from recordings made by a user employing the client device 28. The files are stored on the client device and sent or submitted to the media database 42, through the application interface 20. Another exemplary source is where a user accesses the media elements, through the network 26 (e.g. online), of FIG. 1. The media elements are created by one or more third parties that communicate with the system 10 through the network 26. Media, or other, elements may be downloaded to one or more client devices, then submitted back into the application interface 20 where they are stored in a database, or they can be accessed in network storage where they can be copied and subsequently added to the databases 12, such as the media database 42 in the case where the element is a media element.

In an exemplary implementation of the invention, each of the databases 12 are setup such that each user has their own unique storage space. Optionally, the user may allow access to his/her content, files, elements, or geostory programs by others. In this case, the user indicate that the content, files, elements, or geostory programs (of interest) is to be made public. Then that element is either duplicated and added to a publicly accessible media element database, or it would invoke special sharing mechanisms whereby permissions are granted for some people, or all people, to find that specific element located in an individual's database.

To create an annotation element, for instance, a user accesses the annotation element engine and follows prompts from software applications to create an annotation (e.g. enter text into text box, change font, color, type face, etc. . . . ), and to then position the annotation on the globe and/or screen display. When the user is done, the user publishes the annotation element. At that point, the annotation element is saved as a file and added to the annotation database located in application storage (such as storage 62). From there, the user can access the storage 62 find the annotation file of interest and add it to the geostory organizational schema.

Map layer elements, similarly to media elements, come from two sources: (a) map layers created by a user within a network according the methodologies and techniques outlined in U.S. patent application Ser. No. 15/679,065, filed on Aug. 16, 2017, by Kyle Vanderlugt et al. and entitled "NON-RESOLUTION MAP TILING A GEOSPATIAL MAPPING SYSTEM" and U.S. patent application Ser. No. 15/465,474, filed on Mar. 21, 2017, by Kyle Vanderlugt et al., and entitled "A SYSTEM AND METHOD FOR RENDERING GEOSPATIAL MAPS" and (b) map layers come from third parties and accessed from a database within the network (e.g. online) where they can be copied and subsequently added to the map layer database 40. Once a map layer is created, it may be added to a publicly accessible and searchable database.

Similarly, a user can create geostory camera elements, as a camera pathway connecting two camera positions, as described herein. The user saves the geostory camera elements in the camera database 46.

By way of example, to create a geostory about earthquakes around the globe, map layer elements, media elements, and camera elements may be created or needed. These elements need not be in any particular order. The user obtains the map layer (geostory) elements and then creates the camera position elements, as described above, and adds each of these elements to the geostory organizational schema. Lastly, the user identifies, online, or in a database, or by creating elements, from a device the desired media element(s) (e.g. a movie about volcanos, pictures of volcanos, etc. . . . ). The user then adds the media element(s) into the geostory organizational schema. The user can then modify the elements in the geostory organizational schema until the user creates and finalizes the geostory program.

In an exemplary implementation, elements may or may not be associated with one another. For example, when searching for elements for the above example of a Geostory on earthquakes, a user may search for elements such as tectonic plates, Pompeii, eruptions, tsunamis, and the like. When locating individual elements for inclusion in a geostory program, a search may be performed, for instance, by name, key word, or by use of a tagging system, among other criteria. Further, the search may be performed for elements across the databases 12 (e.g. search for earthquakes simultaneously across map layer, media, annotation, or camera databases). The search may be performed within a specific database (i.e. search of earthquake in the database 42), or a search may be performed in other databases maintained by third parties for which permission has been granted.

In exemplary embodiments of the invention, four databases are represented as individual storage units although it is understood that any number of databases may be employed. Each database represents the collection of all similar geostory element file types (e.g. geostory media elements). Further, each database, such as database 42, may contain any number of electronic folders and sub-folders, each containing any number of geostory elements. A geostory program may be created with as little as one geostory element in which case only one database need be accessed.

In the case of a tagging system, tags are generated and assigned to geostory elements. When it's time to create the geostory description file, a user creates or finds all of the geostory elements the user needs for its desired geostory and the geostory elements are then retrieved from one or more corresponding databases and gathered or collected together (before editing) into the geostory organizational schema. Upon the collection and organization of the geostory elements, geostory elements may or may not be further edited. Editing is a choice left up to the user. When edited, the geostory description language is changed, in accordance with one exemplary method of the invention. In accordance with another method, the geostory element itself is changed while the geostory description language remains unchanged. The geostory element, prior to editing, and after editing remains in the same database location.

The tagging system is generally used to describe a geostory element thereby improving the chances of finding a desired geostory element through a search process. In the earthquake geostory example presented above, elements relating to volcanos, tectonic plates, ash, or the city of Pompeii may be desirable to build a geostory. If corresponding elements are tagged well, searching the database to find relevant files (corresponding to elements) to supplement the geostory can be performed when building the geostory.

It is noted that content other than that which is identified herein, such as media, annotation, map layers, and camera positions, may be employed in exemplary implementation of the invention. Moreover, more than four databases may be employed is necessary to maintain and store further geostory elements.

Upon receipt and storage of all desired (element) content, the databases 12 and their corresponding engines 14 process/analyze the received content and pass the processed contents to the system 18. The system 18 starts to create a geostory program, in the form of a geostory description file, comprised of "geostory description language", upon the receipt of content in the form of geostory elements. The geostory description file includes the geostory description language and is automatically created and updated as geostory elements are added to the geostory organizational schema. The geostory description language describes the starting point, ending point, and duration of the geostory, as well as the timing, sequence, and characteristics of each geostory element. Example of elements characteristics, described in the geostory description language, without limitation, include the type of element, e.g. media vs. annotation vs. camera vs. layers, timing of the element in the sequence of the geostory organizational schema, and transition properties (e.g. fade in/fade out).

As previously noted, each geostory requires the creation of a geostory organizational schema and the geostory description language defines the geostory. The geostory organizational schema defines the organization and structure of the geostory elements described in the geostory description language. Language defines the syntax for describing the geostory elements. Stated differently, the geostory organization schema defines the organization of the geostory elements described in the geostory file (or "program"). The resulting description language includes not only the description of those elements in sequence and in parallel to the elements according to the organizational schema, but also additional parameters such as language needed to initiate the geostory player application system, the timing and duration of the geostory, and the closing of the geostory player application system upon completion of the geostory program.

The geostory description language includes the program or code with the geostory file and the geostory file is ultimately played, as the geostory, by the system 24 of the client device 28. That is, once the geostory file is transmitted to the client device 28, by the geostory engine 18 and through the application interface 20, it is played by the system 24 and the user of the client device 28 enjoys a cinematic 3D video and audio geostory, displayed on the user's client device display by the client device display interface.

The duration of a geostory is determined when the geostory is created by the system 18 of FIG. 1. A geostory may be created to be a few seconds long or an entire year long. Within the geostory, each geostory element is characterized by a duration. In other words, how long the geostory element is, in terms of play time, is one of the characteristics of the geostory element.

The geostory elements may be media content, annotation content, map layer content or camera of the invention. To this end, a camera pathway transition could occur for 30 seconds and an embedded audio file can be 4 minutes meaning that a current camera pathway can be the same pathway for 30 seconds before it is replaced by another pathway or simply not used and an audio file (part of a media (content) element may be 4 minutes long, in terms of the duration it is played. Each element is added, organized, and/or edited by a user as seen in Panel D of FIG. 13 which may, or may not, overlap with another audio file, for instance. An element can overlap in any number of ways, e.g. an audio file can overlap with a video file, which can overlap with a map layer file, as well as a camera pathway file.

As previously noted, certain characteristics of a geostory element is identified by the geostory element itself. For example, the location of the geostory element and the geostory element's type. Such characteristics are included in the description of that element in the geostory description file.

In an exemplary implementation, as the geostory configuration file (also known herein as the "geostory file/program") is automatically created and updated, the user 30 is able to see the effect of the geostory element modifications on, for instance, a globe displayed, through the geostory engine system 18, by the client device display interface. For example, adding geostory elements to the geostory organizational schema (also referred to herein as "organizational schema"), results in automatic updating of the geostory description language, and the following audio and visual effects may be observed; the user 30 observes a spinning globe, after a camera pathway element (defined by at least two camera positions) is added to the geostory organizational schema, and the user 30 may hear an audio voice narration, after media (content) elements are added to the geostory organizational schema. In an exemplary implementation, over the top of the spinning globe, a user may see an embedded video playing, upon addition of another media (content) element to the geostory organizational schema. In this manner, the geostory organizational schema is modified to effectively change the geostory.

The organization of the foregoing elements may be coded into a geospatial (description) file which is transmitted to the client device 28 by the application interface 20, through and the network 26. Upon receipt of the geospatial (description) file (or the "geostory configuration file") by the client device 28, the client device 28 reads the geospatial (description) file and the system 24 thereof plays the above-noted elements of the spinning globe example according to the terms embedded in the geospatial (description) language until the end of the geospatial file is reached at which time the latter signals the system 24 to stop playing the geostory.

The geostory configuration file contains the descriptions of the parameters of the geostory elements. Different geostory elements have different parameters and typically include the location of the files that make up the geostory elements, the type of files that make up the geostory elements, when the geostory element begins to play in the sequence of the geostory organizational schema, and the like.

Separate from the geostory configuration file, each geostory element is in itself one ore more files including information that is not included in the geostory configuration file. Using the example of a map layer element about earthquakes: When this earthquake map layer is added to the geostory organizational schema, the location of the file(s) making up the map layer, the type of map layer file(s)—map layer—the file name, and the start time, are added to the geostory description language. But what is typically not added to the geostory description language is the tiling scheme, the data, and anything else specific about the composition of that layer. All of this information is the details or characteristics of the geostory element itself. Thus, the geostory program can be changed by either changing independently or both, the geostory itself, and/or the geostory description language. The geostory organizational schema captures the description of geostory elements and turns the captured description into a geostory configuration file.

Each of the engines 14, in FIG. 1, generates a respective geostory file and adds the characteristics of the geostory element to the geostory element. For example, the type of element, the location of the element and the type of file that carries the content of the geostory element are all added to the geostory element.

The geostory player application system 24, when transcribing geostory elements of a geostory file, uses the element objects and element controllers, created during the reading of the geostory program, as guidance to find the location of the geostory elements and execute the identified geostory elements, such that content and information is transmitted through the network 26, to the client device 28.

In an exemplary embodiment, the geostory organizational schema and the geostory description language need not change when a geostory element is edited. The element objects and controllers are directed to the location of the appropriate geostory element, through the network server, and the geostory element is ultimately executed according to the instructions of the element objects and controllers.

The client device 28 need not store the geostory elements in local storage, which would otherwise result in real estate limitations from having too much content and too little storage capacity. In turn, this would cause processing power issues that would otherwise slow down the geostory player function. In an exemplary implementation, the client device 28 is directed to the location of a geostory element, within the databases 12, stored in a place in network memory. The client device 28 may retrieve a geostory element after the geostory element has been edited.

The methods and systems for organizing of geostory elements, in databases 12, may include use of a number of folders and subfolders to designate the location and storage of geostory elements.

The system 24 generates the element objects and element controllers, used by the system 24, to locate, find, and process geostory elements in 12, for execution and playing on the system 24.

During operation, the client device 28 may read and translate geostory configuration file and based on the description of the geostory elements in the geostory configuration file, the element objects and element controllers, then begin to process the geostory elements, within the databases 12. The system 24 then plays the geostory file, after the client device 28 retrieves the geostory configuration file from the system 18, through the network 26.

As earlier discussed, the geostory configuration file includes properties related to geostory elements, such as file type and file location. However, the geostory configuration file typically does not include the contents of the geostory element. For example, an audio file of a media element is typically not a part of the geostory configuration file. Although, in an alternate embodiment, contents of a geostory element may be a part of the geostory configuration file.

The geostory program file database 41, in FIG. 1, is used to store the geostory programs created by the system 18. The system 10, of FIG. 1, allows a user to view a geostory with audio and video content dynamically. In the case where the elements are changed over time (e.g. the earthquake layer updating once every day to show near-real time earthquakes), the same geostory program being viewed dynamically each day such as a smartphone, desktop, or laptop screen would appear different, despite not having changed the geostory program itself.

Figure 2:
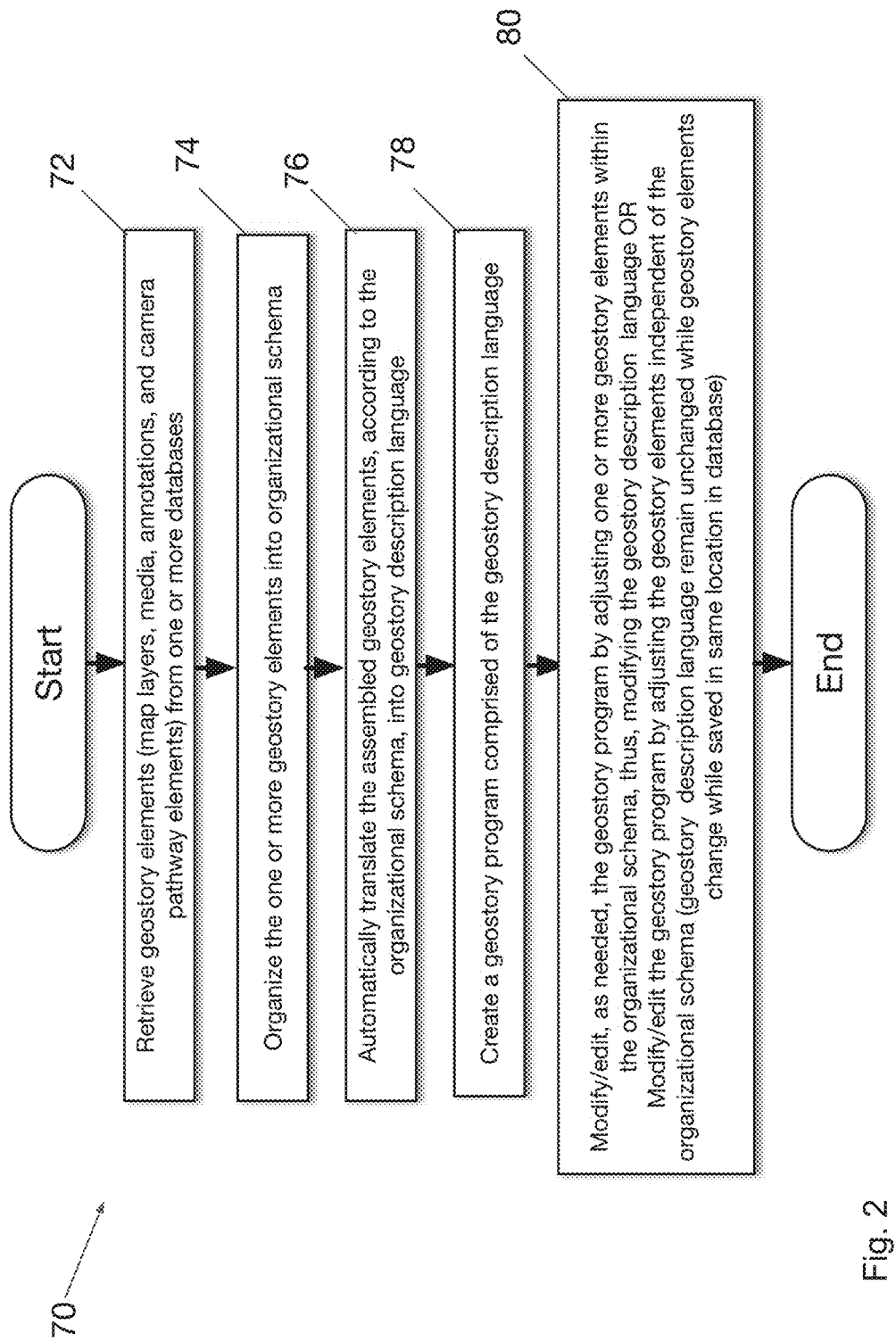
FIG. 2 shows a flow chart of some of the steps performed for creating a geostory, in accordance with an exemplary method of the invention.

FIG. 2 shows a flow chart of some of the steps performed for creating a geostory, in accordance with an exemplary method of the invention. The process 70 starts at step 72 where geostory elements are retrieved, as discussed above. The elements may be map layers, media, annotations, and/or camera positions/pathways, among a host of other types. In the example of FIG. 2, the elements are retrieved from databases, such as the databases 12. Typically, the system 18 retrieves the geostory elements. It is noted that the elements are made up of files, which can be of various types.

Next, at step 74, the retrieved geostory elements of step 72 are organized into a geostory organizational schema by the system 18. Subsequently, at step 76, the system 18 automatically translates the assembled geostory elements, of step 74, according to the geostory organizational schema, created at step 74, into a geostory description language. Translating involves the system recognizing the geostory element (as to its type, for instance) and capturing the geostory element descriptions from the files of the geostory element and splicing the captured geostory element descriptions into the geostory description framework. The design of the organization of the framework (i.e. Panel D, shown in FIG. 13) identifies where to translate, or add, the geostory element descriptions into the geostory description language.

Next, at step 78, a geostory program/file is created from the geostory description language, by the system 18. The geostory program is defined as a file that represents the completion of the work done in the geostory organizational schema. Therefore, when a user is done adding and adjusting the organizational framework, the geostory description language is finalized and the geostory program is considered completed. Once created, the geostory program is transmitted through the application interface 20, through the network 26, to the client device 28 where it may be played by the system 24.

Next, suppose the user wishes to modify the geostory once the user has been presented with the geostory. For instance, instead of having earthquakes around the world shown, as a part of the geostory, the user would rather view instances of fire around the world. At step 80, in FIG. 2, one way to edit the geostory program is by adjusting one or more of the geostory elements within the geostory organizational schema. In the above earthquake-fire example, the geostory layer element within the geostory organizational schema is adjusted by removing the earthquake layer element and replacing that with a global instances of fire geometry layer element. This adjustment automatically modifies the geostory description language, which results in a modification to the geostory program. Another way to edit the geostory program, at step 80, is by modifying/editing the geostory program by adjusting the geostory elements directly and independent of the geostory organizational schema where the geostory description language remains unchanged while the geostory elements are edited. The geostory elements remain in the same location, within for example, the databases 12, before and after editing. When it is time to play the modified geostory program, the geostory program is automatically modified, in accordance with the changes to the geostory elements.

Figure 3:
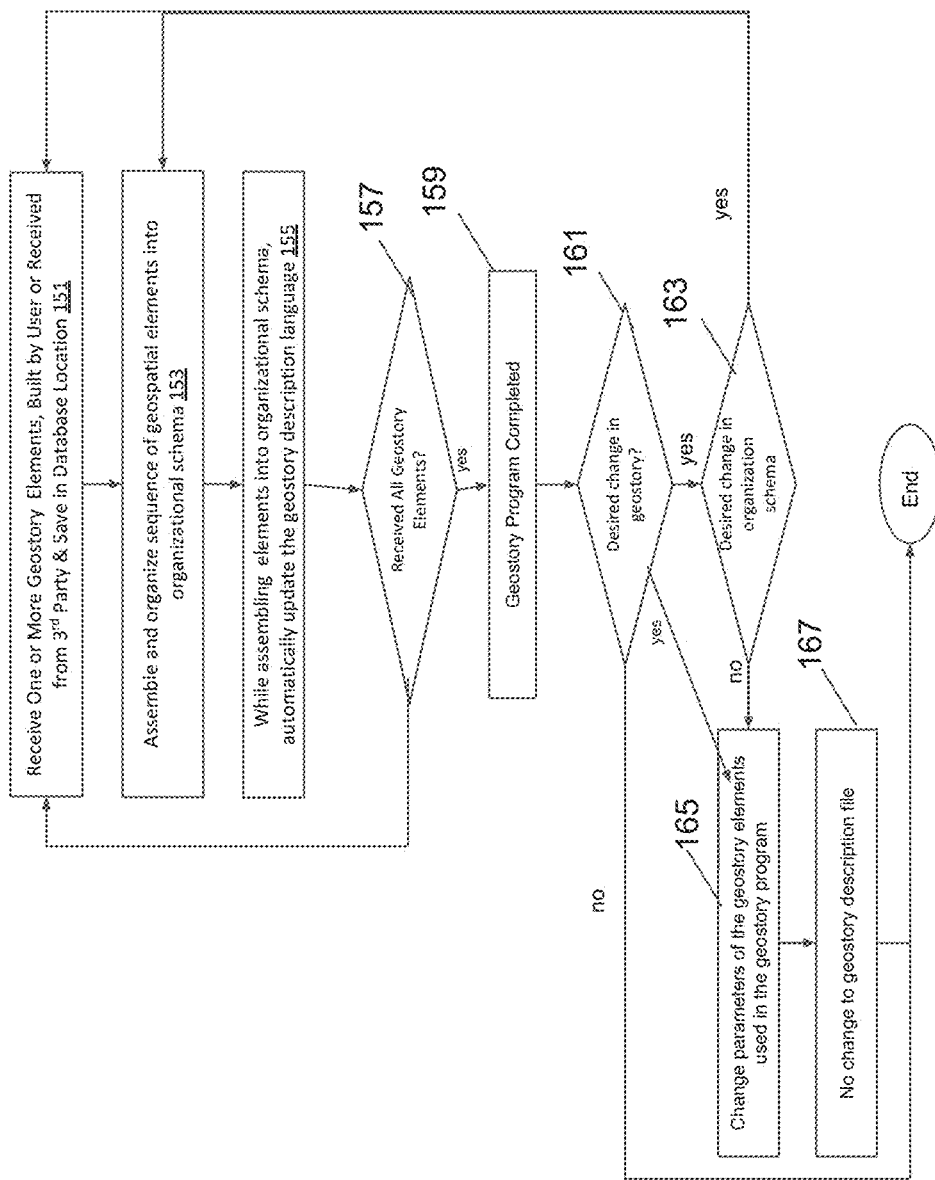
FIG. 3 shows a flow chart for the process of creating and editing a geostory program, in accordance with an exemplary method of the invention.

FIG. 3 shows a flow chart for the process of creating and editing a geostory program, in accordance with an exemplary method of the invention. At step 151, one or more geostory elements are received and saved in a location within the databases 12, based on the type of geostory elements received. These elements may be built by a user of, for example, the user 30, or a third party. Next, at step 153, the system 18 assembles and organizes a sequence of geospatial elements into a geostory organizational schema. Thereafter, at step 155, while the assembling of the geostory elements is taking place, at step 153, the geostory description language is automatically updated to reflect the modifications to the geostory organizational schema.

Next, at 157, a determination is made by the system 18 as to whether, or not, all geostory elements are received and if not, the process goes back to step 151 and proceeds, as described above. Otherwise, if all geostory elements have been determined to have been received, the process goes onto step 159 where the geostory program is completed. If at 161, a change in the geostory is desired, the process continues to 163 and if no change is desired, the process ends.

At 163, it is determined by the system 18, whether, or not, a change/modification to the geostory organizational schema is desired. As previously noted, there are a couple of ways to change the geostory, one way is by editing the geostory elements where the geostory organizational schema and geostory description language remain the same and another way is by changing the geostory organizational schema. In FIG. 3, steps for performing the latter are shown by the process going from 163 to either step 151 or step 153 and continuing from there, depending on whether additional geostory elements are to be added.

In the case where the geostory organizational schema is not to change, at 163, the process goes to step 165 where parameters of the geostory elements are modified, by the system 18, to reflect the desired changes to the geostory and the process continues to step 167. At step 167, it is noted that no change to the geostory description file is made. The arrow at 163 going to the arrows at 151 and 153, in FIG. 3, refers to a user wanting to change a geostory program by adjusting the geostory organizational schema. The user can do this by either/both, adding in another geostory element into the geostory organizational schema 151 or by adjusting the geostory elements already including in the geostory description language 153.

Figure 4:
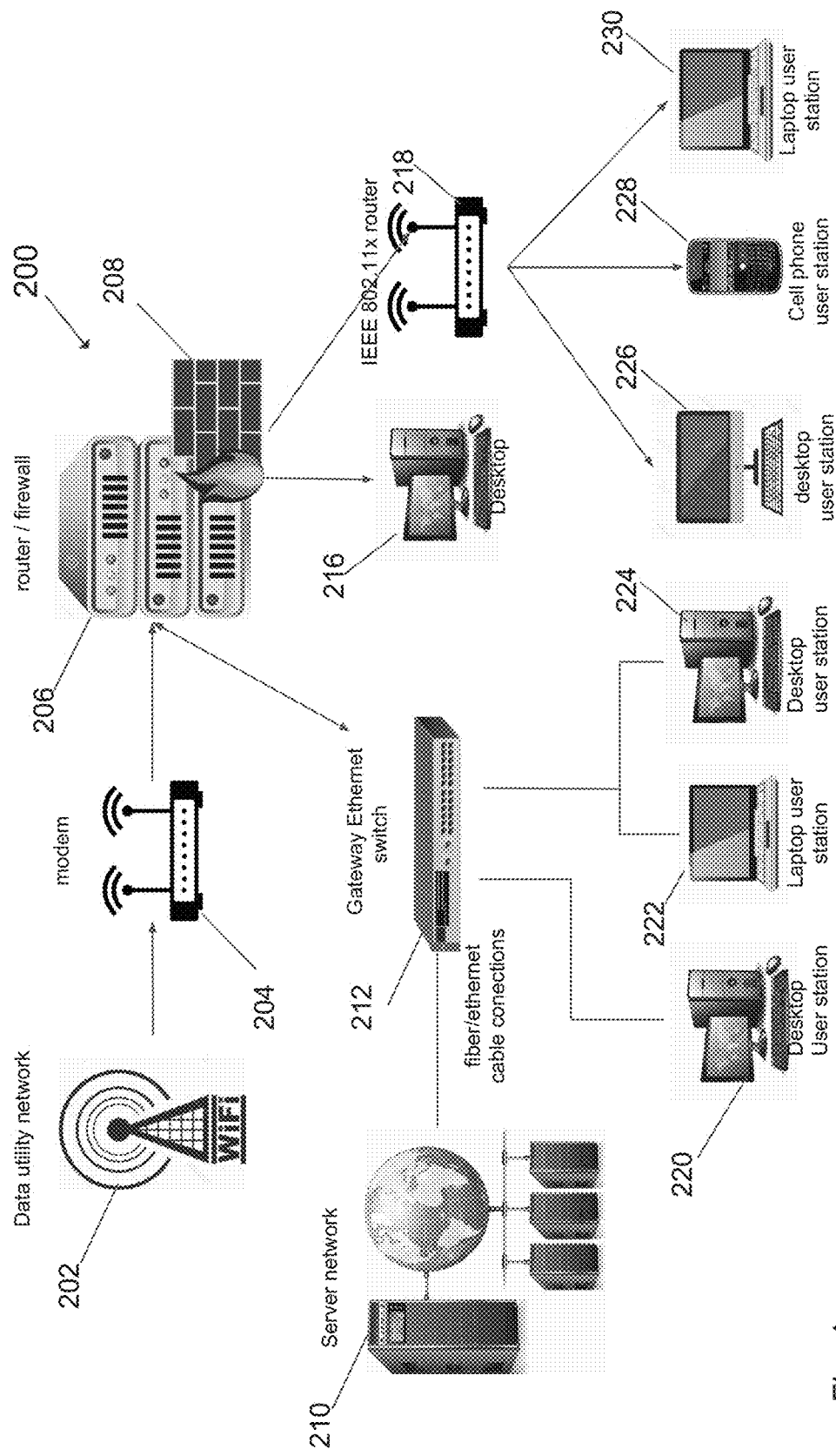
FIG. 4 shows a network system 200 including an exemplary embodiment of the invention.

FIG. 4 shows a network system 200 including an exemplary embodiment of the invention. System 200 is analogous to the communication protocols that make up the network 28 in FIG. 1. In the exemplary embodiment of FIG. 4, users of the system 200, for example a user of the laptop user station 222 and/or a user of the desktop user station 220, connect their respective client devices, such as the laptop user station 222 and/or a user of the desktop user station 220, to the internet by wireless and wired connections, through a network, such as the network 26 of FIG. 1. In the wireless case, a data utility network 202 provides network connectivity and access via IEEE 802.11x. communication protocol. A communication signal 202, is received by a modem 204, which directs the received signal through a router 206 and a firewall 208, directly to a desktop client device 216, or routes the received signal, through a IEEE 802.11x router, to any number of client devices including desktops 226, cell phone 228, and or/laptop user stations 230.

In the wired scenario, a gateway (Ethernet) switch 212 connects personal client devices (such as desktop user station 220, laptop user station 222, and desktop user station 224) to a server network 210, using fiber, Ethernet, and twisted cable. "User station", as used herein refers to the location of a user device (or "client device"). For example, a "laptop user station" refers to the use of a laptop by a user at a particular location and/or participant of a network. Any one of the stations 220-230 may represent a client device, such as the device 28, of FIG. 1. The device 28 (of FIG. 1) may communicate with the server network 210, through the switch 212 or through the IEEE 802.11x router 218, firewall 208, router 206, or modem 204, through the network 202, to build and play geostory files. Similarly, the desktop user station 216 may build or play geostories by communicating through a data utility network 202, to the elements, databases, storage units, and systems and structures, shown and discussed in FIG. 1, which are accessed via a network server 202, through the firewall 208 and router 206, and the modem 204, through the network 202.

Figure 5:
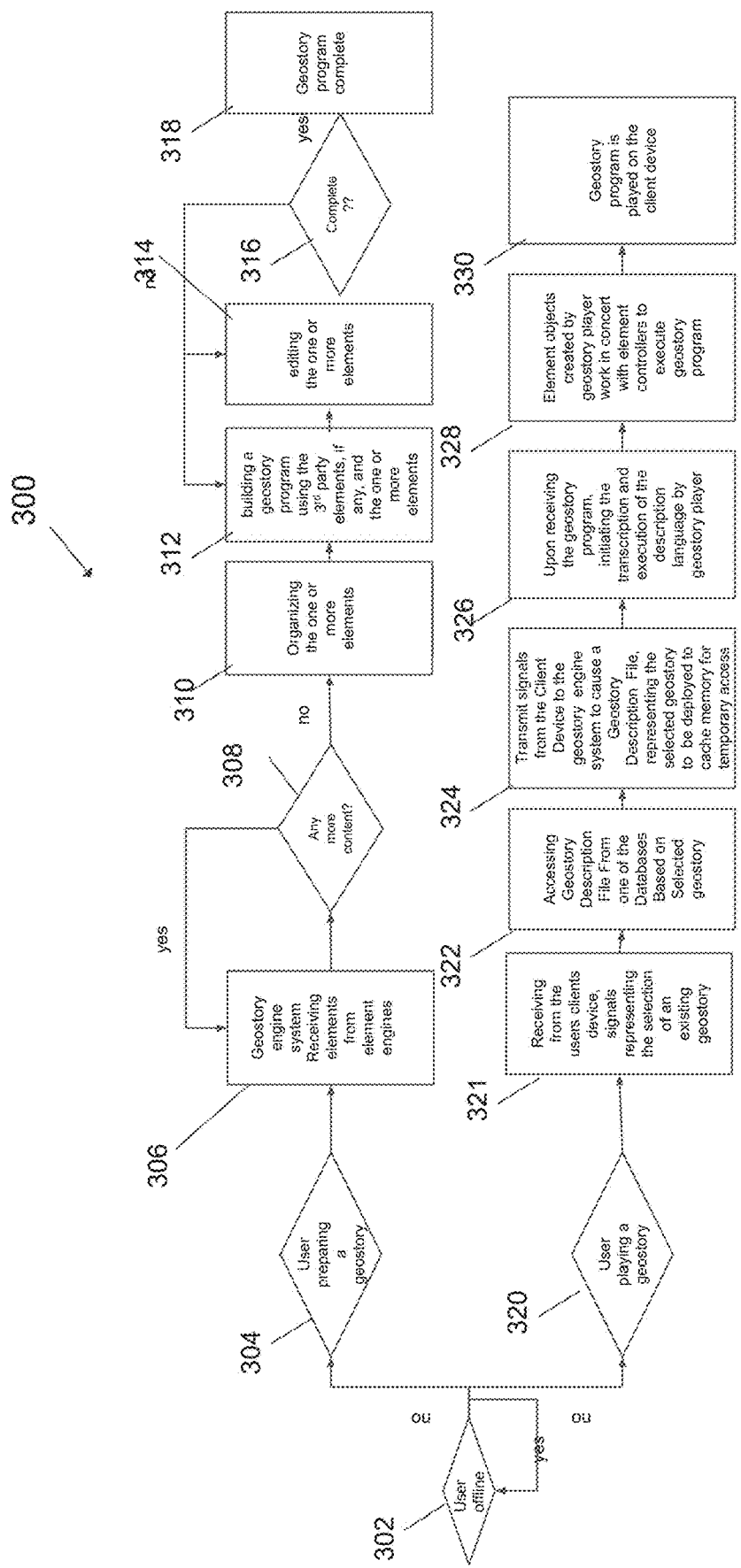
FIG. 5 shows a flow chart 300 of some of the steps performed by the system 10 of FIG. 1, in accordance with an exemplary method of the invention.

FIG. 5 shows a flow chart 300 of some of the steps performed by the system 10 of FIG. 1, in accordance with an exemplary method of the invention. Initially, at 302, a client device (220-230) is unable to connect to the network server using either wireless communication protocols (e.g. IEEE 802.11x) or cabled connection, as outlined relative to FIG. 4. Stated differently, the client device is unable to connect to the elements, databases, storage units, and systems and structures, shown and discussed in FIG. 1. That is, when communication protocols (e.g. IEEE 802.11x), used in the network system 200, are absent, the client device is unable to access the geostory elements from the databases, storage units, and systems and structures, shown in and discussed relative to FIG. 1.

If a determination is made, at 302, that the user is "offline", (i.e. does not have access to the network) 200, the client device attempts to re-establish connection with the network server 210 (of FIG. 4), as specified by the communication protocol set up through the network server interface 22 (of FIG. 1) until the user is ultimately "online" and is able to access the network (such as the internet). Once a network communication connection is made available that connects the client device to the internet, the system enables the functionality of the geostory system engine 18 to begin production of geostory program files (of a geostory) 304, and also enables the functionality of the geostory player application system to receive and play geostories, at 320 in FIG. 5.

If at 304, preparation for the creation of a geostory file is in order, the process continues to step 306 where geostory elements are received by the geostory engine system 18, of FIG. 1, from one or more of corresponding engines 14 (of FIG. 1). Creation of the geostory file continues, for example, by the addition of media content or annotations of the media content, and so forth. Steps 306-318 are generally performed by the structures shown to the left of the network 26, in FIG. 1.

The geospatial elements received at 306 from the geostory engine system 18, through the network 26, may be either user or third party-generated elements or a combination thereof, as earlier discussed in FIG. 1. At 308, a determination is made as to whether or not all of the contents of the geostory file have been received and if so, the process continues to step 310, otherwise, the process goes back to steps 306 until all contents are received.

Next, at step 310, the system 18 (in FIG. 1) organizes the received contents (or geostory elements) and building of a geostory description file is started, based on the user and/or third party-created elements. Next at step 312, the geostory description file is generated or updated.

Next at step 314, the geostory description file, created at step 312, is edited by modifying one or more of the geostory elements. After all edits are performed, as determined at 316, step 318 is performed where the geostory program/file is completed and ready for transmission to the client device 28 through a network 26. Otherwise, if not all edits have been made, the process repeats steps 312 and 314 until all edits are completed.

In the case where the user is playing a geostory, by execution of the geostory file by the client device 28, rather than creating a geostory file, the process starts at step 321 where signals are received through the network 26, from the client device, representing a selection and request to play an existing geostory, one that is of interest to the user. Next, at step 322, the geostory file that corresponds to the user's selection is accessed from the database 41, through the network 26. Typically, but not always, the selected geostory file is from the databases 41 although other means for providing the selected geostory file, such as by a third party may be employed instead.

Next, at step 324, under the control of the system 24, signals are transmitted to the geostory system engine 18, through network 26, that cause the existing and selected geostory program to be deployed from the database 41 to a temporary location, such as cache, of the client device. The temporary location may be cache, in an exemplary implementation of the invention. Next at 326, upon receiving the geostory program, the player application system 24 initiates transcription and execution of the geostory description language. During the transcription process, as the geostory player (or system 24) reads the configuration tile, the geostory player creates corresponding element objects for all of the geostory element descriptions contained in program description language (also known herein as "geostory description language"). Then at step 328, element controllers work in sequence and in parallel with the element objects to execute the geostory program.

Finally, at step 330, the selected geostory program is played on the client device, using the system 24. Thus, the selected geostory program, once deployed to the client device, through for instance the network 26, is temporarily stored in the client device while the geostory is to be played or is playing. Otherwise, the geostory program need not consume valuable memory space in the client device. In the case where the client device has sufficient capacity, geostory programs may be saved by the user in memory storage.

The processes and features shown and discussed herein can be implemented by a wide variety of machine and computer system architectures and in a wide variety of network and computing environments.

Figure 6:
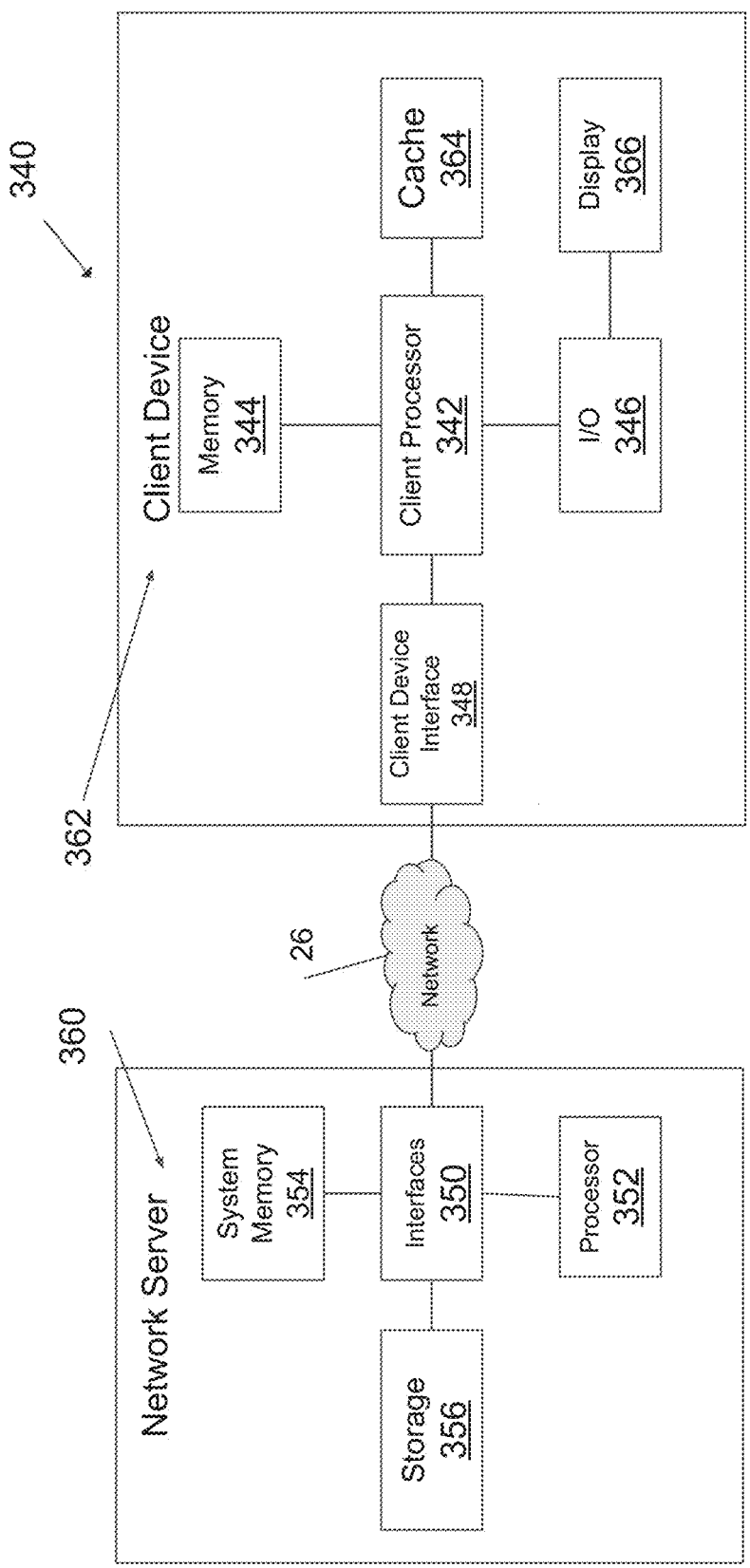
FIG. 6 illustrates an example of a computer system 340 that may be used to implement one or more embodiments described herein, in accordance with exemplary embodiments.

FIG. 6 illustrates an example of a computer system 340 that may be used to implement one or more embodiments described herein, in accordance with exemplary embodiments. The computer system 340 includes sets of instructions for causing the computer system 340 to perform the processes and features discussed herein. The computer system 340 may be connected (e.g., networked) to other devices.

The computer system 340 is shown to include a client device 362 and a network server 360, such as the structures shown on the left side of the network 24 in FIG. 1. Each of the client device and network server includes at least one processor. For example, the client device 362 is shown to include the client processor 342 and the server 360 is shown to include the processor 352.

The client device 362 and the server 360 communicate with one another through the network 26. The client device 362 is shown to include, in addition to the processor 342, client device interfaces 348, (such as the interface 20 in FIG. 1), memory 344, cache 364, input/output (I/O) 346 and one or more executable modules and drivers, stored on a computer-readable medium, directed to the processes and features described herein.

The server 360 is shown to include, in addition to the processor 352, system memory 354, interfaces 350, storage 356 and one or more executable modules and drivers, stored on a computer-readable medium, directed to the processes and features described herein.

Interfaces 348 is shown coupled to the processor 342, which is shown coupled to the memory 344, cache 364, and I/O 346. The interface 350 is shown coupled to the processor 352, which is shown coupled to storage 356 and system memory 354.

I/O 346 causes the client device 362 and the user to communicate. A keyboard and/or pointing device are examples of the I/O 346 or other input/output devices (not shown). Cache 364 typically stores geostory files and memory 344 stores software programs or code executed by the client processor 342 and/or data.

System memory 354 stores program files or software/code executed by the processor 352 and storage 356 stores data.

The client device 362 is further shown to include a display 366 coupled to the I/O 346, perhaps by keyboard and/or pointing device. A geostory is presented to a user at the display 366.

Collectively, these elements are intended to represent a broad category of computer hardware systems, including but not limited to computer systems to access the user's work information, but specify a list of based on the x86-compatible processors manufactured by external systems that are not allowed to access the work information.

Various combinations of granularity of specification of information, and granularity of specification of entities, with which information is shared are manufactured by Intel Corporation of Santa Clara, Calif., and the x86-compatible processors manufactured by Advanced Micro Devices (AMD), Inc., of Sunnyvale, Calif., as well as any other suitable processors.

An operating system manages and controls the operation of the computer system 340, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 340 are described in greater detail below. In particular, the interface 348 provides communication between the client device 362 and any of a wide range of networks, such as an Ethernet (e.g., IEEE 802.3) network, a backplane, etc. Similarly, the interfaces 350 provide communication between the server 360 and any of a wide range of networks, such as an Ethernet (e.g., IEEE 802.3) network, a backplane, etc.

The storage 356 provides permanent storage for the data and programming instructions to perform the processes and features described herein, implemented by the respective computing systems identified herein, whereas the memory 354 (e.g., DRAM) provides temporary storage for the data and programming instructions when executed by the processor 352.

The I/O ports 346 may be one or more serial and/or parallel communication ports that provide communication between additional peripheral devices, which may be coupled to the computer system 340.

The computer system 340 may include a variety of system architectures, and various components of the computer system 340 may be rearranged. For example, the cache 364 maybe on-chip with processor 342. Alternatively, the cache 364 and the processor 342 may be packed together as a "processor module", with processor 342 being referred to as the "processor core". Similarly, the memory 354 may be on-chip with processor 352 and alternatively, the memory 354 and the processor 352 may be packed together as a "processor module" with processor 342 being referred to as the "processor core".

Furthermore, certain embodiments may neither require nor include all of the above components. Furthermore, the computer system 340 may include additional components, such as additional processors, storage devices, or memories. In general, the processes and features described herein may be implemented as part of an operating system or a specific application, component, program, object, module, or series of instructions referred to as "programs".

For example, one or more programs may be used to execute specific processes described herein. The programs typically comprise one or more instructions in various memory and storage devices in the computer system 340 that, when read and executed by one or more processors, cause the computer system 340 to perform operations to execute the processes and features described herein.

The processes and features described herein may be implemented in software, firmware, hardware (e.g., an application specific integrated circuit), or any combination thereof. In one implementation, the processes and features described herein are implemented as a series of executable modules run by the computer system 340, individually or collectively in a distributed computing environment.

The modules herein may be realized by hardware, executable modules stored on a computer-readable medium (or machine-readable medium), or a combination of both. For example, the modules may comprise a plurality or series of instructions to be executed by a processor in a hardware system, such as the processors 342 and/or 352. Initially, the series of instructions may be stored on a storage device, such as storage 356. However, the series of instructions can be stored on any suitable computer readable storage medium. Furthermore, the series of instructions need not be stored locally, and could be received from a remote storage device, such as a server on a network, via the network interfaces 350 and 348. The instructions are copied from the storage device, such as the storage 356, into the system memory 354 and then accessed and executed by the processor 352.

In various implementations, a module or modules can be executed by a processor or multiple processors in one or multiple locations, such as multiple servers in a parallel processing environment. Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

Figure 7:
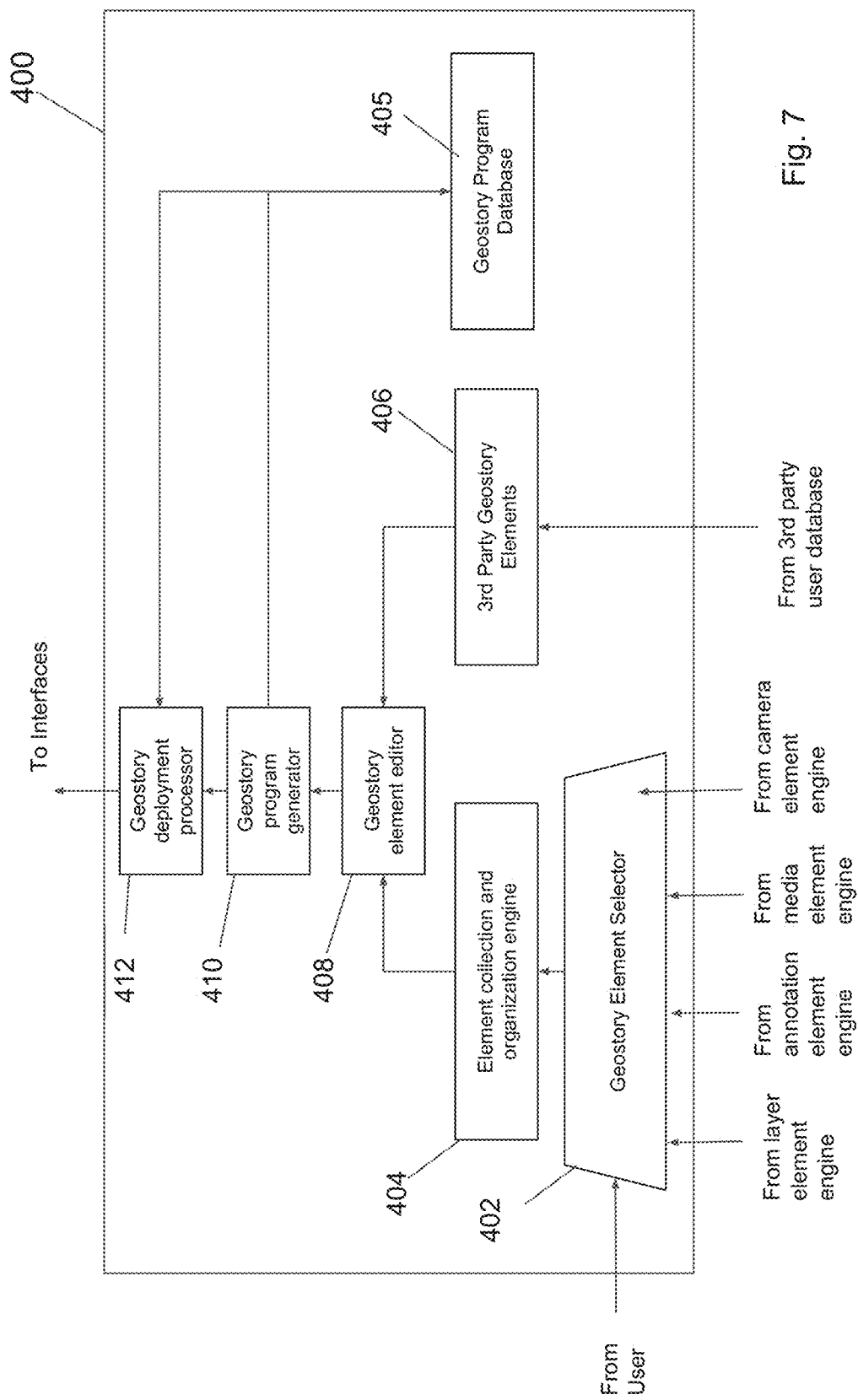
FIG. 7 shows further details of the geostory engine system 400, in accordance with an exemplary embodiment of the invention.

FIG. 7 shows further details of the geostory engine system 400, in accordance with an exemplary embodiment of the invention. The system 400 is shown to include a geostory element selector 402, an element collection and organization engine 404, third party geostory elements, geostory element editor 408, geostory program generator 410, and geostory deployment processor 412. Upon completion, a geostory program is stored in the geostory program database 405. Upon request from the client device, the deployment processor 412 communicates with the geostory program database 41 of FIG. 1, to transmit the file to the client device via the network 26 (in FIG. 1).

The selector 402 receives input from outputs of various engines 14 (in FIG. 1). For example, the output of map layer element engine 48, annotations element engine 52, media element engine 50 and camera element engine 54. The third party geostory elements 406 are elements that are provided by third parties (other than the user). The selector 402 selects one or more of the inputs from the engines 14, based on input signal(s) from the user.

The selected engine outputs, generated by the selector 402, are then collected and organized by the engine 404. This is a process where the selected elements are combined and assembled into a geostory organization schema, defined by the user. Next, the editor 408 edits the organized elements from the engine 404 along with the elements 406 from third parties based on inputs specified by the user (e.g. reducing the duration of a camera pathway between San Francisco and Sydney from 60 seconds to 30 seconds), in order to create the desired effects of the geostory.

The program description language is automatically generated and updated by the program geostory generator 410, in response to changes made during the editing of the geostory elements, by the geostory element editor 408. Once completed, the geostory configuration file (also known herein as the "configuration file") is stored in the geostory program database 405. Upon request from the client device 28 (in FIG. 1), the deployment processor 412 communicates with the geostory database, such as the databases 405, to transmit the geostory configuration file to the client device via the network 26.

Figure 8:
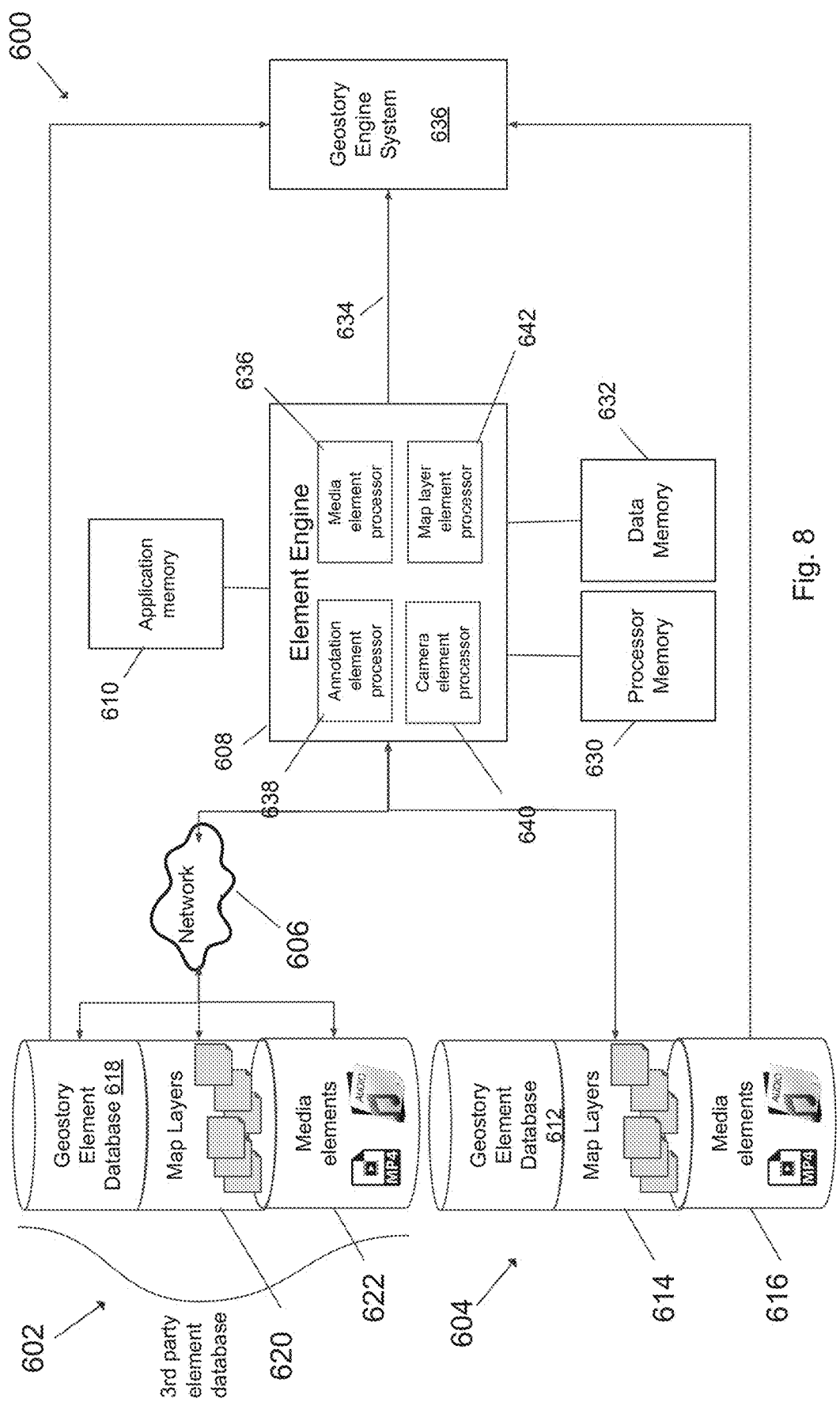
FIG. 8 shows a geospatial system 600, in accordance with an exemplary implementation of the invention.

FIG. 8 shows a geospatial system 600, in accordance with an exemplary implementation of the invention. The system 600 is shown to include third party element database 602 and element databases 604, which are analogous, with the exception of a missing camera element database, to the databases 12 of FIG. 1. In the example of FIG. 8, third party elements are employed, in addition to those by the user, to build a geostory.

The system 600 is further shown to include network 606, element engine 608, application memory 610, processor memory 630, data memory 632 and geostory engine system 636. Element engine 608 and geostory engine system 636 are analogous to engines 14, and system 18 of FIG. 1, respectively.

In FIG. 8, elements, not provided by a third party, are saved in corresponding space in the database 604. For instance, the map layer elements are saved in map layer space 614 and media elements are saved in media space 616. The geostories, or geostory elements, are saved in geostory element space 612. Similarly, in database 602, media elements from a third party is saved in media space 622 and map layer elements are saved in map layer space 620. Geostory elements are saved in geostory element space 618.

Information retrieved from the database 602, such as the various elements stored therein, are transmitted through the network 606. Similarly, information from the element engine 608 is transmitted through the network 606 to the databases 602 and 604.

The element engine 608 is shown to include an annotation element processor 638, media element processor 636, camera element processor 640, and map layer element processor 642. Each of these processors works on corresponding content/element. For example, the media element processor 636 processes media elements, map layer element processor 642 processes map layer elements, and so on. Each of these processors executes software or code stored in memory 630 and saves data/content to the memory 632. Application memory 610 saves information relating to the application executed by the client device. An example of the execution of this system applies to the editing of map layer file of the map layer element. In this example, the file might contain 12 layers of tiles and the description for how those (map) tiles are executed on the client device (for (map tiling system description). For further details about map tiling, the reader is referred to U.S. patent application Ser. No. 15/679,065, filed on Aug. 16, 2017, by Kyle Vanderlugt et al. and entitled "NON-RESOLUTION MAP TILING A GEOSPATIAL MAPPING SYSTEM", and U.S. patent application Ser. No. 15/465,474, filed on Mar. 21, 2017, by Kyle Vanderlugt et al., and entitled "A SYSTEM AND METHOD FOR RENDERING GEOSPATIAL MAPS".

For the purposes of creating a desired geostory only 6 level of tiles are needed. Using the map layer element processor 642, 6 layers of geospatial tiles are removed. The necessary application software needed to execute this process from the client device, through the (server) network 606, is stored in application memory 610. A copy of the new configuration file containing the modified tiling scheme is transmitted to and stored in map layer storage database space, such as a space 614. With regard to the processing of content, as described in the above example, geostory elements created by the user (database 604) or 3rd party geostory elements, identified and organized into database 602, can all be processed within the element engine 608 by their respective element processor (638, 636, 640, and 642)

The engine 608 transmits the geostory elements that are ready for input into a geostory organizational schema to the geostory engine system 636 where they are used to create a geostory description file, such as shown in the example of FIG. 7.

Figure 9:
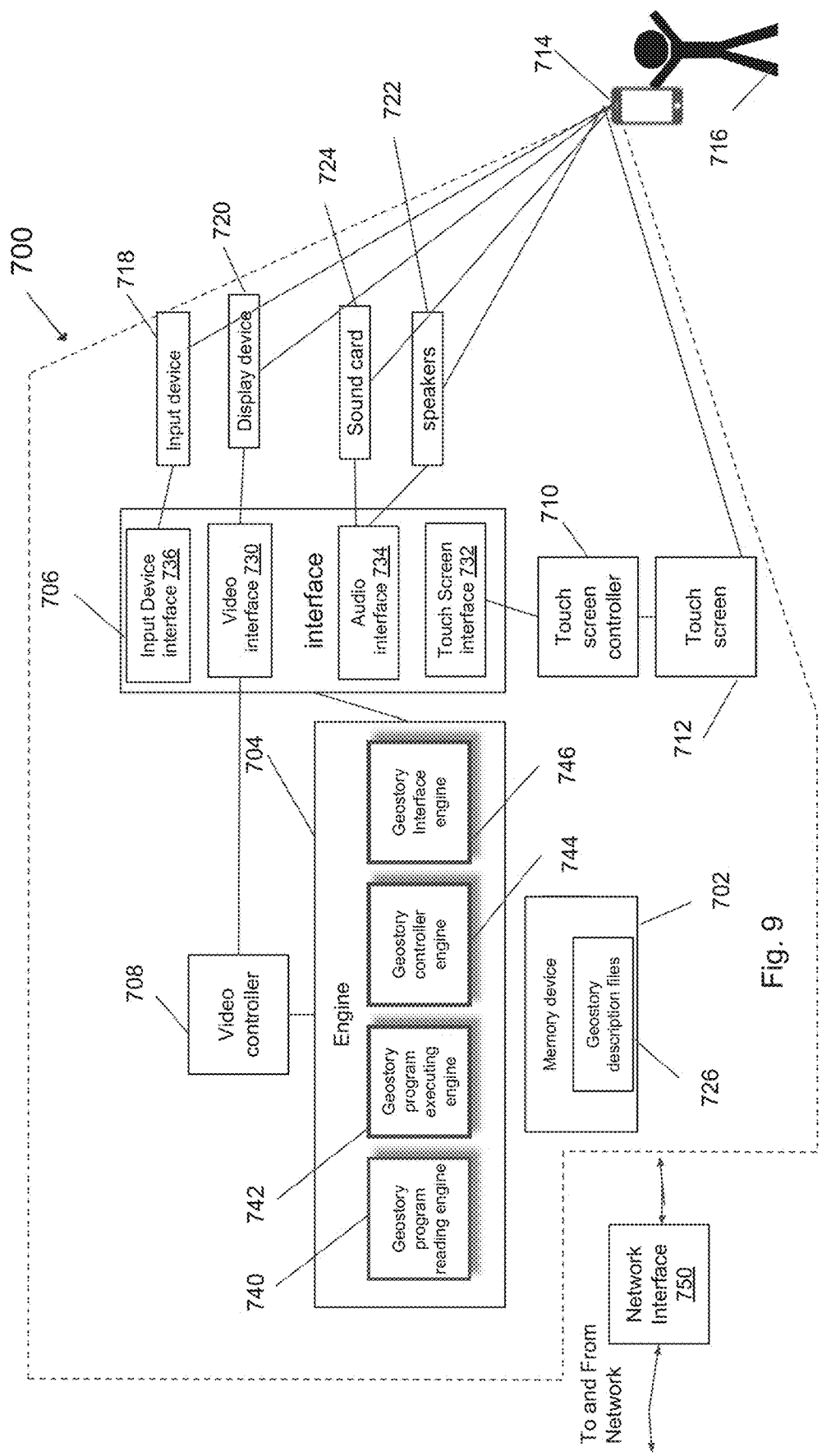
FIG. 9 shows, in conceptual form, further details of a geostory player application system 700, which is analogous to the system 24 of FIG. 1.

FIG. 9 shows, in conceptual form, further details of a geostory player application system 700, which is analogous to the system 24 of FIG. 1. In FIG. 9, the system 700 is shown to be employed by the user 716, as a part of the client device 714 (analogous to the client device 28 of FIG. 1). The system 700 uses a program or application, in addition to hardware, such as one or more processors, controllers, memory, input/output device, and the like. It is noted that the system 700 of FIG. 9 is merely one exemplary implementation and in no matter limiting, and other implementations are contemplated.

The system 700 is shown to further communicate with a network, such as the network 26, of FIG. 1, through the network interface 750.

In FIG. 9, the system 700 is shown to include a memory device 702, interface 706, engines 704, video controller 708, touch screen controller 710, touch screen 712, input device 718, display device 720, sound card 722, and speakers 724. The interface 706 is shown to include a client device display interface (also referred to herein as "video interface") 730, touch screen interface 732, audio interface 734, and input device interface 736. The memory device 702 is shown to include geostory description files 726.

In FIG. 9, the user 716 is shown to communicate to the interface 706 through the speakers 722, sound card 724, display device 720, input device 818 and/or touch screen 712. For example, the user's voice that is input to the system 700 or vice versa, the system 700 audio communication with the user 716 is through the sound card 724 and speakers 722, respectively. The touch screen 712 is used by the user 716 to communicate with the system 700 by touch controls, such as that which is offered by an iPhone, made by Apple, Inc., of Cupertino, Calif. The display device 720 is the screen the user 716 uses to gain insight into the system 700, such as when a geostory is presented with the display device 720 to the user 716. All other types of inputs to the system 700, such as keyboard input, is done through the input device 718, by the user 716.

The touch screen controller 710 directs communication from the touch screen 712 to the interface 732 of the interfaces 706 and from the interface 732 to the touch screen 712.

The input device 718 is shown coupled to the input device interface 736 of the interface 706, the display device 720 is shown coupled to the video interface 730 of the interface 706, the sound card 724 and speakers 722 are both shown coupled to the audio interface 734 of the interface 706, and the touch screen 712 is shown coupled to the touch screen controller 710, which is in turn shown coupled to the touch screen interface 732 of the interface 706. Each of the interfaces 730 through 736 translates the input received from or the output transmitted to the user 716 and one of the devices/cards/speakers/screens, identified above, and the engines 704. For example, the input device interface 736 translates input from the user 716, through the input device 718, to communicate with the engines 704, the video interface 730 translates input from the user 716, through the display device 720, and the engines 704 and so on.

In FIG. 9, the engines 704 are shown to include a geostory program reading engine 740, a geostory program executing engine 742, a geostory controller engine 744, and a geostory interface engine 746. The engines 704 is shown coupled to the video controller 708 and further shown coupled to the memory device 702, and the geostory description files 726 of the memory device 702.

The video controller 708 is shown coupled to the video interface 730 of the interface 706 and is further shown coupled to the engines 704. It directs communication between the engines 704 and the video interface 730 to, for example, show, in video form, a geostory to the user 716.

The memory device 702 may be made of volatile, non-volatile, persistent, non-persistent, and other types of memory cells suitable for storing the files 726. The files 726 is read by the engine 740 and next, executed by the engine 742. The engine 744 directs communication between the memory device 702 and the engines 740, 742, and 746. The interface engine 746 directs communication between the outside world, i.e. structures located externally to the engines 704, such as the video controller 708, optionally the memory device 702, and the engines 704.

For example, during an exemplary operation of the system 700, the files 726 are read by the engine 740, through the engine 746, under the control of the engine 744, and executed by the engine 742 to cause presentation of the geostory, through the video controller 708, interface 730, and display device 720, to the client device 714. Each of the geostory description files describes the location and specifications of the files of a geostory element but does not actually include the geostory element itself. Accordingly, when playing or presenting a geostory to the user 716, the geostory description files contains geostory description language that includes the locations of the (files of the) geostory elements, for example, in the databases 12, of FIG. 1, in addition to perhaps other housekeeping information about the geostory elements. Upon the receipt of this information, the network interface 750 of the system 700 requests the identified geostory elements (of the geostory file about to be executed to play the geostory), through a network, such as the network 26 (of FIG. 1). Thus, the geostory description files 726 is perhaps analogous to a metafile in that it is information about the geostory elements.

Figure 10:
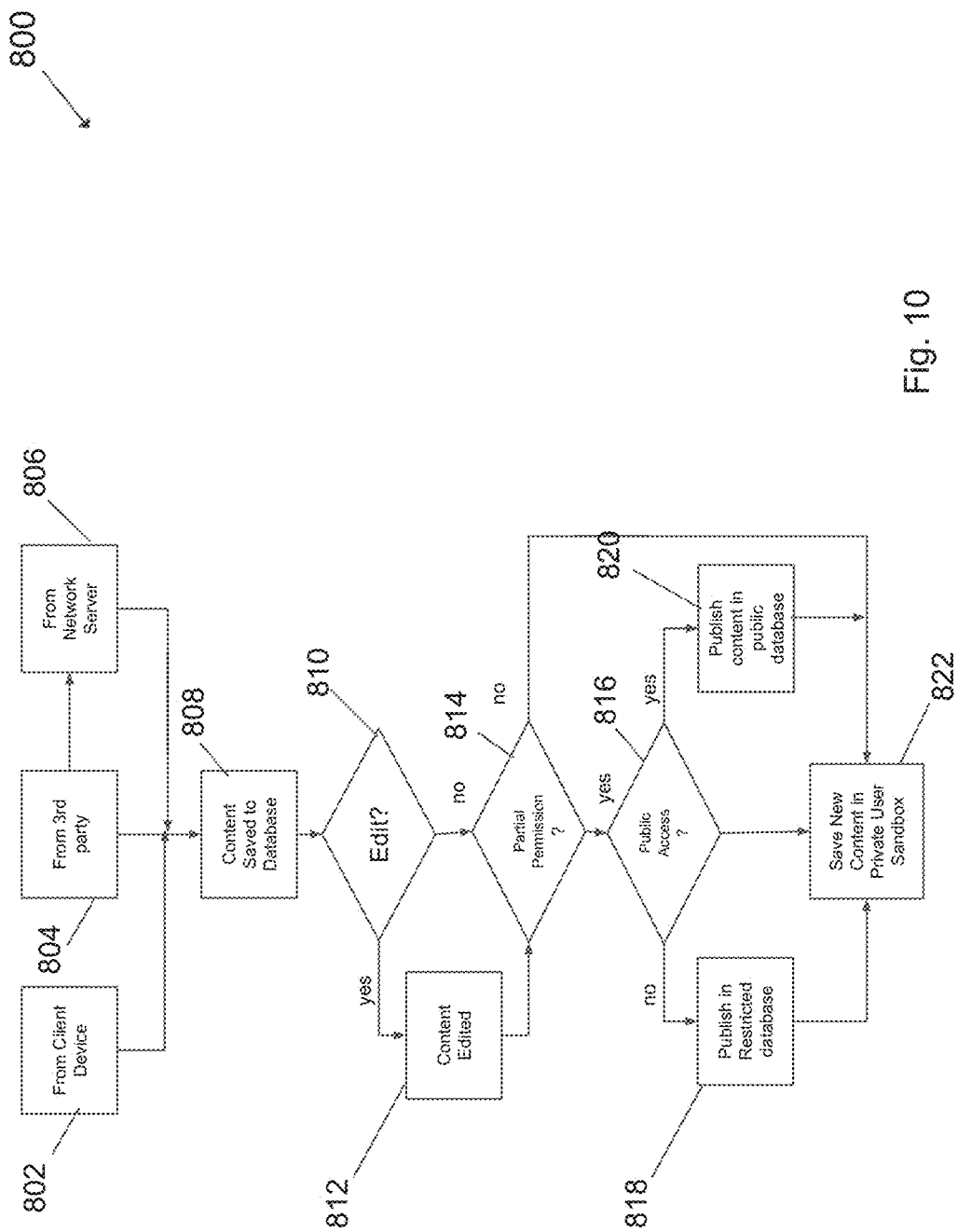
FIG. 10 shows a flow chart of the steps performed by the system 800 (analogous to the system 10), in accordance with an exemplary method of the invention.

FIG. 10 shows a flow chart of the steps performed by the system 800 (analogous to the system 10), in accordance with an exemplary method of the invention. Content (or elements), from various sources are shown to be saved to a database, in the flow chart 800. More specifically, elements from the client device 802, such as the client device 28 of FIG. 1, elements from a third party 804, and elements from a network server 806 may be created or downloaded through the use of one or more networks. The network server 806 may be a server including elements for use by the public. In other words, one or more users have chosen to share their respective geostory and/or other elements.

Upon saving all elements at 808, a user may determine to edit any of the elements as described in system 600. Upon a determination at 810 that editing is required, the process continues to step 812 where the content/elements that are to be edited are edited and the process moves to 814. If, at 810, it is determined that no editing is required, the process continues to 814.

At 814, a determination is made as to whether or not the downloaded and possibly edited elements are to be partially published where some elements are published for use by the public at large and others remain restricted and not published. If at 814, it is determined that a partial publication is in order, the process continues to 816, otherwise, the process proceeds to step 822.

At 816, it is determined who within the public is afforded access to the elements. Specific groups of users may be given access rights or specific users may be afforded access while others are not. There are many ways of determining who is afforded access and who is not. For those who are to have access to the elements, the downloaded and possibly edited elements are published and made accessible to them for use while other users do not have access because the use of the elements is restricted. If at 816, it is determined that at least some of the public is allowed access, the process goes to step 820 and if not, the process continues onto step 818.

At step 820, the downloaded and possibly edited elements are published to the public at large and the process moves to step 822. At step 818, elements that are not to be published to at least some users are not published while others are published and the process continues to step 822. At step 822, the elements, whether published or not or whether partially published or not, are saved in the user's storage space, within a database, such as the database 604. Restricted elements are so tagged and public elements are also tagged accordingly.

Figure 11:
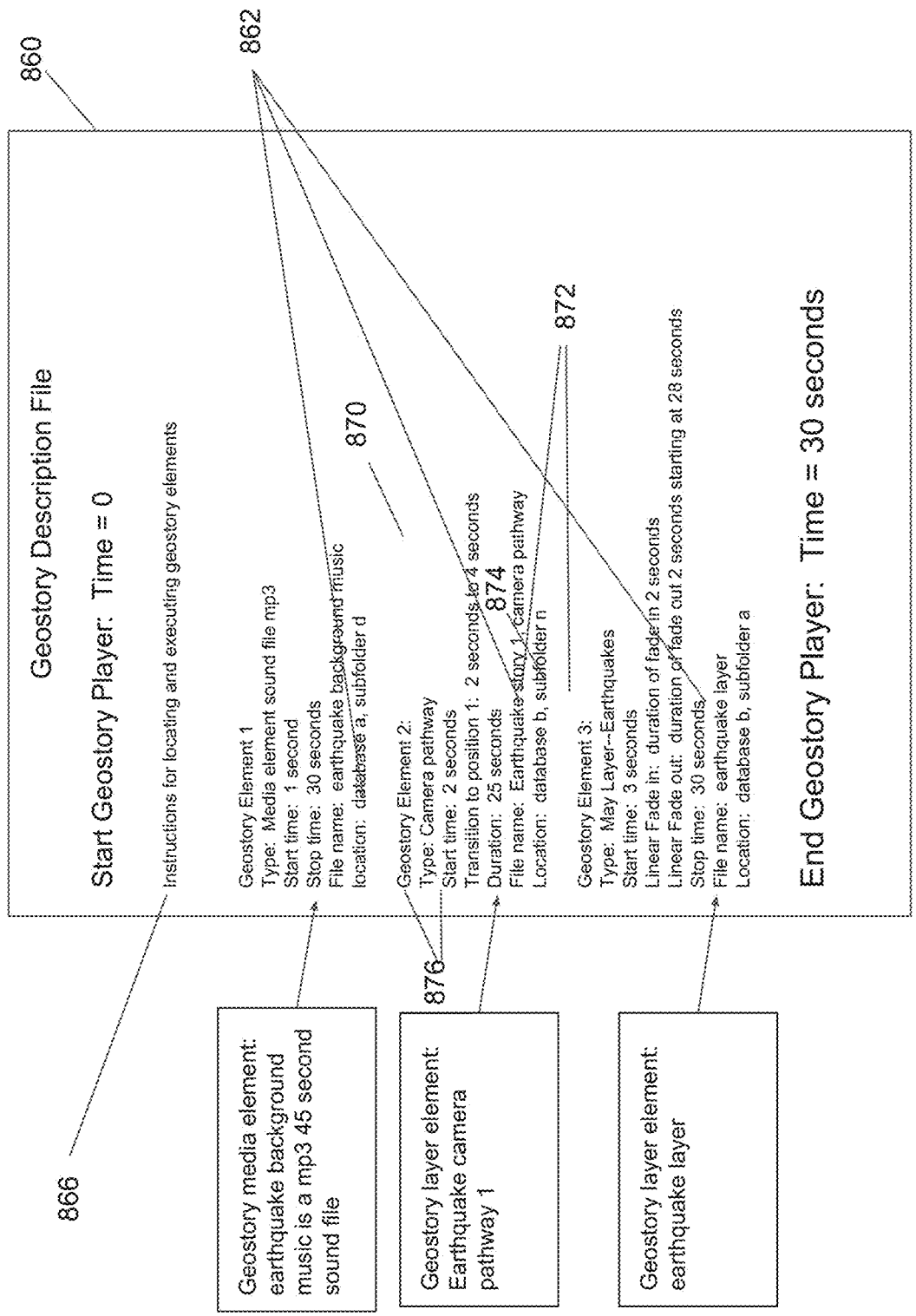
FIG. 11, shows an illustrative example of a geostory description file 860, in accordance with an exemplary implementation of the invention.

FIG. 11, shows an illustrative example of a geostory description file 860, in accordance with an exemplary implementation of the invention. The geostory description file of FIG. 11 is created by the geostory engine system 18, in FIG. 1, using the process 70 in FIG. 2, which is deployed to the client device 28 through a network 26. The geostory description file contains the descriptions for multiple geostory elements, Geostory Element 1, Geostory Element 2, and Geostory Element 3, which are added to the geostory description file based on the translation of the elements in the geostory organizational schema, as described in process 70 (FIG. 2). The geostory description file includes the geostory description language that provides instructions for the geostory player to begin playing, when to begin playing, for example as shown at 862, in FIG. 11, and instructions for locating and executing geostory elements, as shown at 866, in FIG. 11

The geostory elements in the geostory description file, i.e. Elements 1, 2, and 3, are executed in order and in sequence as they are contained in the description file. The execution of elements may overlap such that two elements are played at the same time. For example, Geostory Element 1, a media element sound file on earthquakes, as shown at 870, in FIG. 11, starts at a time of 1 second and plays for 30 seconds. Element 2 starts at a time of 2 second and plays for 25 seconds, in which case it overlaps with element 1 from 2 to 25 seconds, shown at 872, in FIG. 11. Information contained in the geostory description language, that describe element parameters include but is not limited to; the type of element, start time, special features such as how that element appears (e.g. by fade in), what is the timing of those special features (e.g. 2 to 4 seconds, as shown at 874, in FIG. 11, the file name and the location of that file, as shown at 876, in FIG. 11.

Figure 12:
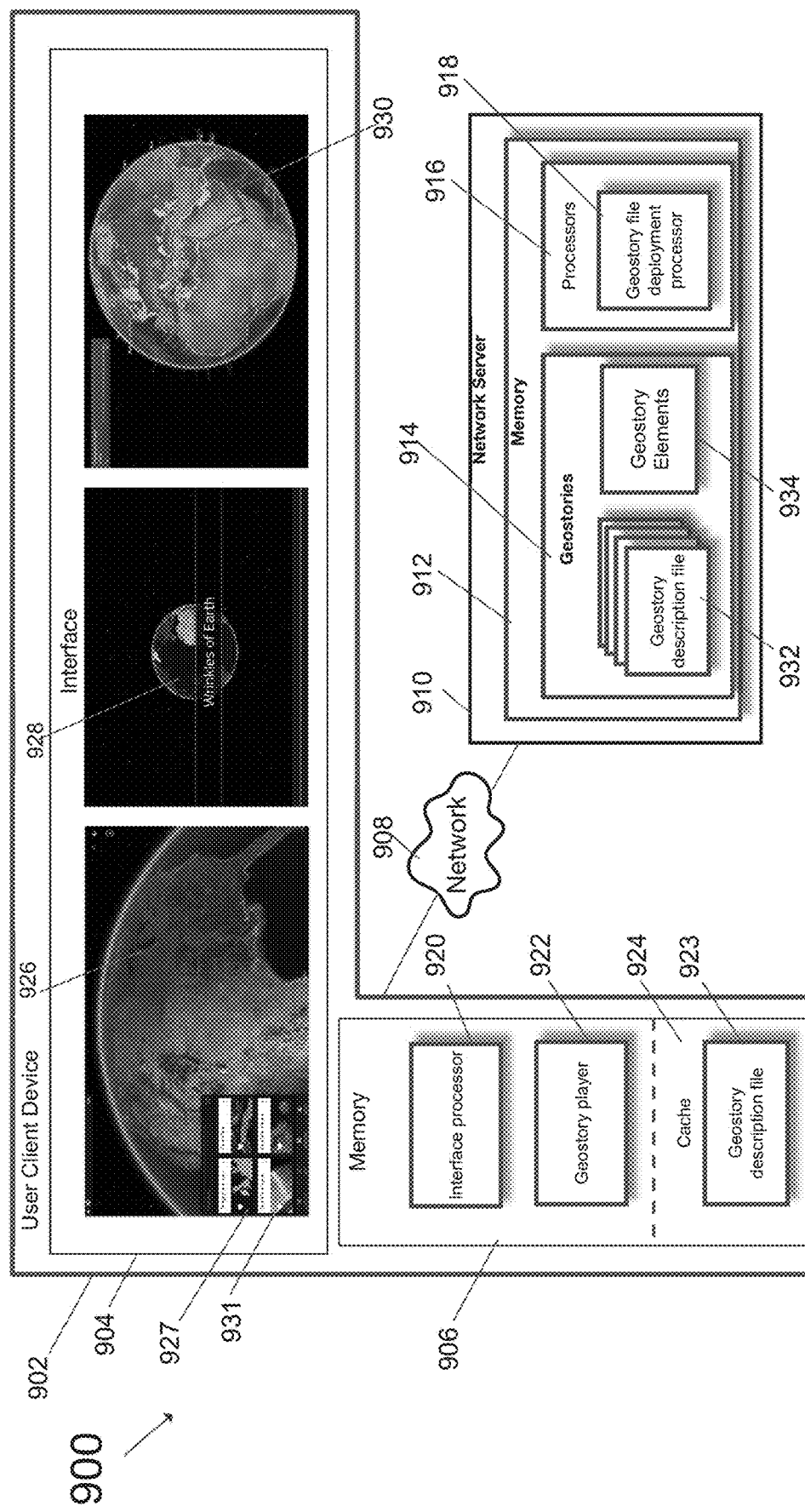
FIG. 12 shows a geospatial system 900, in accordance with an exemplary embodiment of the invention.

FIG. 12 shows a geospatial system 900, in accordance with an exemplary embodiment of the invention. In FIG. 12, relevant portions of the network server and client device are shown. An example of a network server are the blocks shown to the left of the network 26 of FIG. 1 when looking into the page.

In FIG. 12, the system 900 is shown to include a (user) client device 902, analogous to the client device 28 (of FIG. 1), network 908, analogous to the network 26 (of FIG. 1), and network server 910, which is generally comprised of the structures shown to the left of the network 26, in FIG. 1, when looking into the page. The user client device 902 is shown to include an interface 904 and memory 906. The network server 910 is shown to include memory 912, which is shown to include geostories files 932 and elements 934 and processors 916.

Memory 906 is shown to include an interface processor space 920, a geostory player space 922, and cache 924. Cache 924 is shown to store the geostory description file(s) 923, which are analogous to the geostory description files 726, of the system 700. Cache 924 is an exemplary embodiment of the memory device 702, of system 700.

The interface 904 presents images 926, 928, and 930 to the user. The image of the interface 904, at 926, is an image of a partial globe (virtual partial globe) which also contains an interactive catalogue, shown at 927 and 931, which show all of the available geostories, available to be played and viewed by a client device. The interface 904, at 928, is the image, displayed by a client device, after a specific geostory has been selected, from a geostory catalogue, for playing. The interface 904 shows, at 930, an image of an actual geostory while it is played, in accordance with exemplary embodiments of the invention. More specifically, the globe, at 930, is shown, in 3D, and possibly spinning, possibly with an audio overlay. As the geostory is played, at 930, media elements, for example, audio describe a specific condition around the world, such as the occurrences of earthquakes or titanic plates, over a specified period of years. Media elements can also cause the globe to spin while displayed on the client device display. Map layer elements (or "map layers") make up the globe and dynamically, and in real-time, show the globe as the geostory is being played.

The interface processor space 920 includes information that causes communication between a display interface and the geostory player in the space 922. The geostory player space 922 includes information that controls and causes playing of geostories. Cache 924 stores the geostory programs, after the geostory programs are generated by the network server 910, as previously described. Subsequently, the geostory programs are transmitted from the network server 910 to the client device 902. Generated geostory description files 923 contain coded descriptions of the geostory elements 934, as previously discussed.

Geostory elements 934 may include all types of elements, such as media, annotations, camera positions/pathways, layers, and the like. The elements 934 are used to synthesize the program description language outlined in the files 932, which are the geostory configuration files, as they are generated, and before they are transmitted to be saved in the files 923 of the client device 902. The geostory file deployment processor 918, of the processors 916, controls deployment of the geostory description files 932 to the user client device 902, through the network 908. As a geostory description file, from the files 932, is received by the user client device 904, it is saved in the files 923 space of the cache 924. Because the geostory (program) file does not contain the actual geostory elements and rather includes descriptions of the geostory elements. Geostory elements are not required to be transmitted and downloaded to the client device, thus improving client device memory storage management, which in turns increases client device performance, and results in an expedited and improved geostory player and viewing experience. Also, because the geostory description file 932 describes the location and specifications of the files of the geostory elements, but which does not include the geostory elements themselves, any edits to the geostory elements is transcribed during transcription of the geostory program, by the geostory player. Thus, a geostory about earthquakes for example that contains a real-time map layer of visualized global earthquakes, shows and plays the geostory that contains real-time earthquakes anytime it is played without having to recreate the geostory program file.

Figure 13:
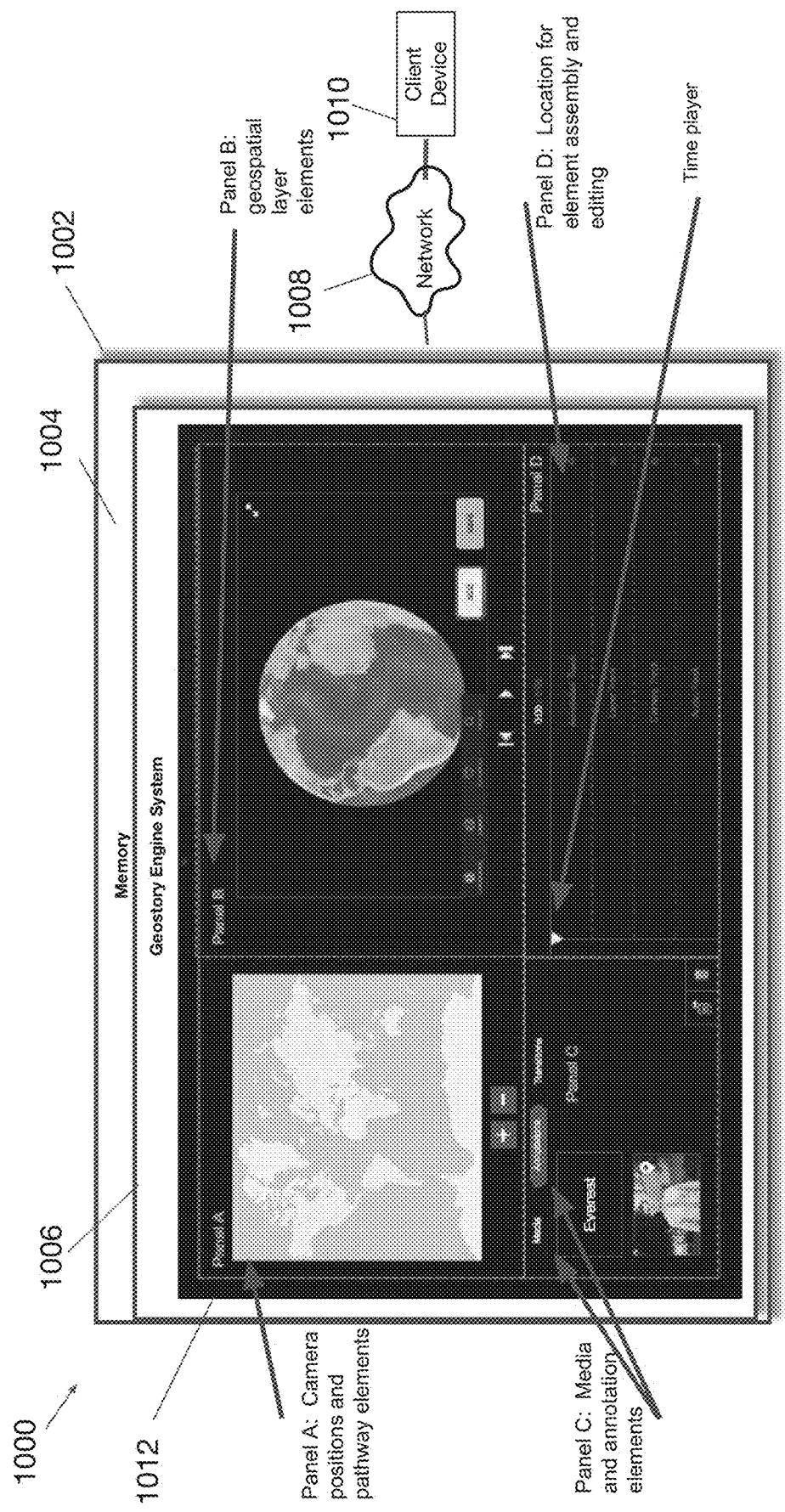
FIG. 13 shows an exemplary geostory system 1000, analogous to 18 in FIG. 1, as viewed on a client device display, and communicating with a client device 1010, through the network 1008, in accordance with an exemplary implementation of the invention.

FIG. 13 shows an exemplary geostory system 1000, analogous to 18 in FIG. 1, as viewed on a client device display, and communicating with a client device 1010, through the network 1008, in accordance with an exemplary implementation of the invention. In FIG. 13, system 1000 is shown to include memory 1004 and the geostory engine system 1006. The memory 1004 is analogous to the memory 354 of FIG. 6 and the network server 1008 is analogous to the network servers 908 of FIG. 12 and the client device 1010 is analogous to the client device 28 of FIG. 1.

An element collection and organization engine 1012, of system 1000, is analogous to the processor 404 of FIG. 7. FIG. 13 is conceptual, showing the display of the element collection and organization engine 1012, as seen on the client device interface of the client device 1010. The collapsed block diagrams of network server 1002 and the display part of the client device 1010 are shown overlayed in an effort to ease understanding of the display, presented to the user of the client device 1010, while showing some of the other structures, such as the network 1008 and network device 1002.

In FIG. 13, display 1012 shows four panels, panels A-D, to the user. Each panel represents a location where each geostory element can be accessed and edited and a location from which the geostory element can be added to the geostory organization schema, shown in panel D. FIG. 13 effectively shows, in various parts and by use of panels, a user-friendly tool for the user to employ in building or playing a geostory program.

Panel A shows a location on the client device display where camera positions and pathways, are created by the user. Panel B shows a location, on the client device display, where (geospatial) map layers, which are typically stored in a layer database, such as the layer database 40 of FIG. 1, and where the layers can be accessed and added to the geostory organizational schema. Panel C shows a location on the client device display where media and annotation elements are created or accessed by the user. Panel D shows a location on the client device display where all of the geostory elements are added and edited by the user. Each geostory element is added to a specific track in Panel D and the process of adding and editing individual elements automatically updates the resulting geostory configuration file, as earlier discussed.

Figure 14:
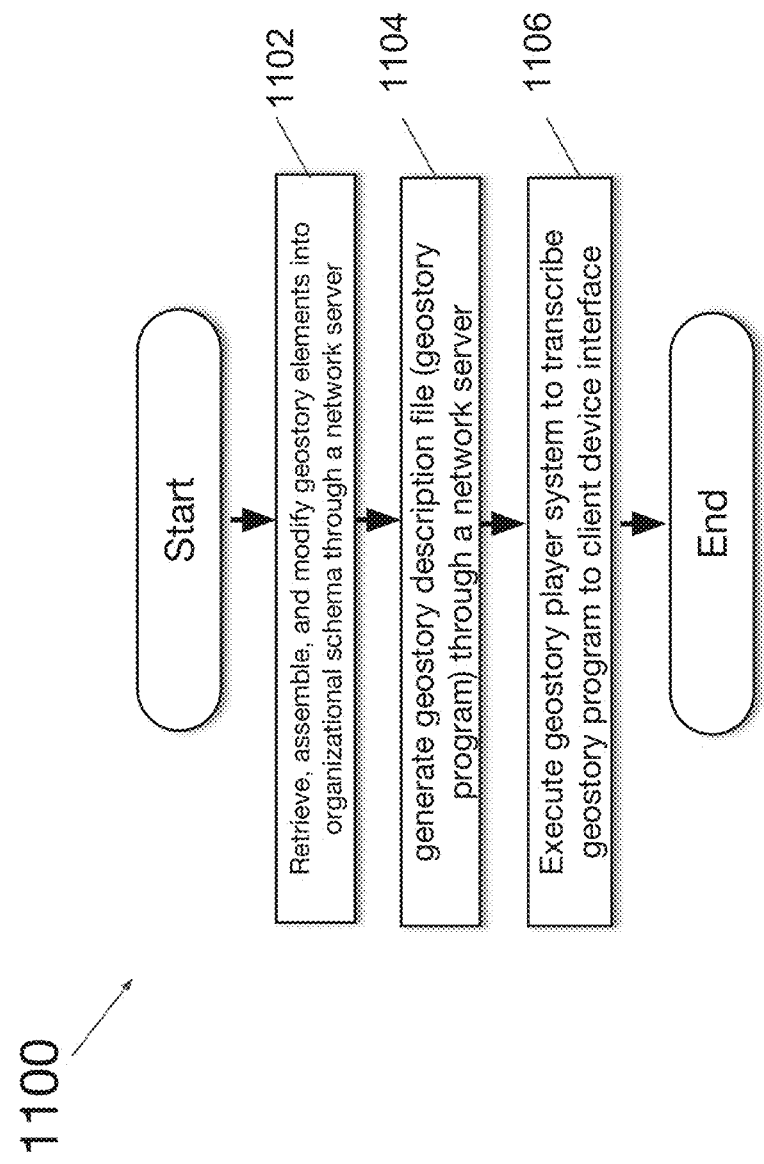
FIG. 14 shows a flow chart 1100 of some of the steps performed by a geospatial system of an exemplary implementation of the invention, such as the system 10 of FIG. 1.

FIG. 14 shows a flow chart 1100 of some of the steps performed by a geospatial system of an exemplary implementation of the invention, such as the system 10 of FIG. 1. At step 1102, the geostory elements, made of media elements, annotation elements, map layer elements and camera position elements or a combination thereof, are retrieved from their respective databases and combined, organized and possibly edited into a schema, as previously discussed. Next, at step 1104, a geostory description file is generated from the process executed in step 1102 by a network server, as done by a network server at step 1102. At step 1106, the geostory description file of step 1104 transmitted to the client device where it is transcribed and translated into cinematic content on the client device interface, such as the interface 904 of FIG. 12.

Figure 15:
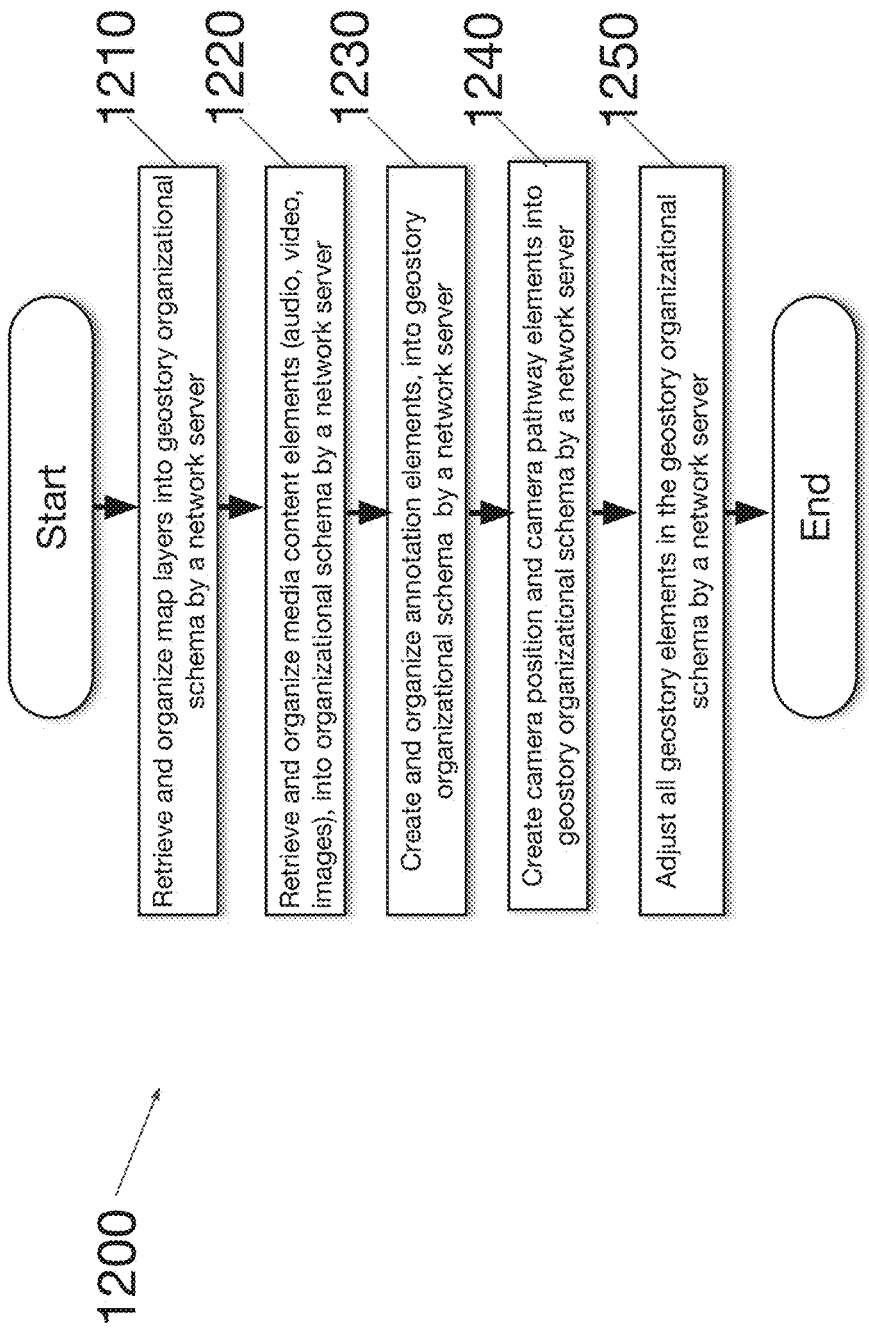
FIG. 15 shows a flow chart 1200 of an exemplary process for creating and creating a geostory and editing it, in accordance with a method of the invention.

FIG. 15 shows a flow chart 1200 of an exemplary process for creating and creating a geostory and editing it, in accordance with a method of the invention. At step 1210, camera map layers are retrieved, from a database or third parties, and organized into geostory organizational schema, by a network server, such as the structures shown to the left of the network 26, when looking into the page, in FIG. 1. At step 1220, a different type of elements, namely, media (content) elements, are retrieved and organized into the geostory organizational schema, created at step 1210. At step 1230, a different type of elements, namely, annotations elements, are created and organized into the geostory organizational schema, created at step 1210. Next, at step 1240, camera positions and pathway elements are created, based on the user's input, and organized into the geostory organizational schema of step 1210. The geostory program is created once all of the geostories have been created and retrieved, which is after step 1240, in FIG. 15. At step 1250, the user or a third party wishes to edit the geostory created after step 1240, therefore, all geostory elements created and/or retrieved at steps 1210-1240, are adjusted accordingly, into the geostory organizational schema, created at step 1240, by the network server.

Next, at step 1220, other types of elements are retrieved and organized, such as audio, video, and/or layer elements, by the network server.

Figure 16:
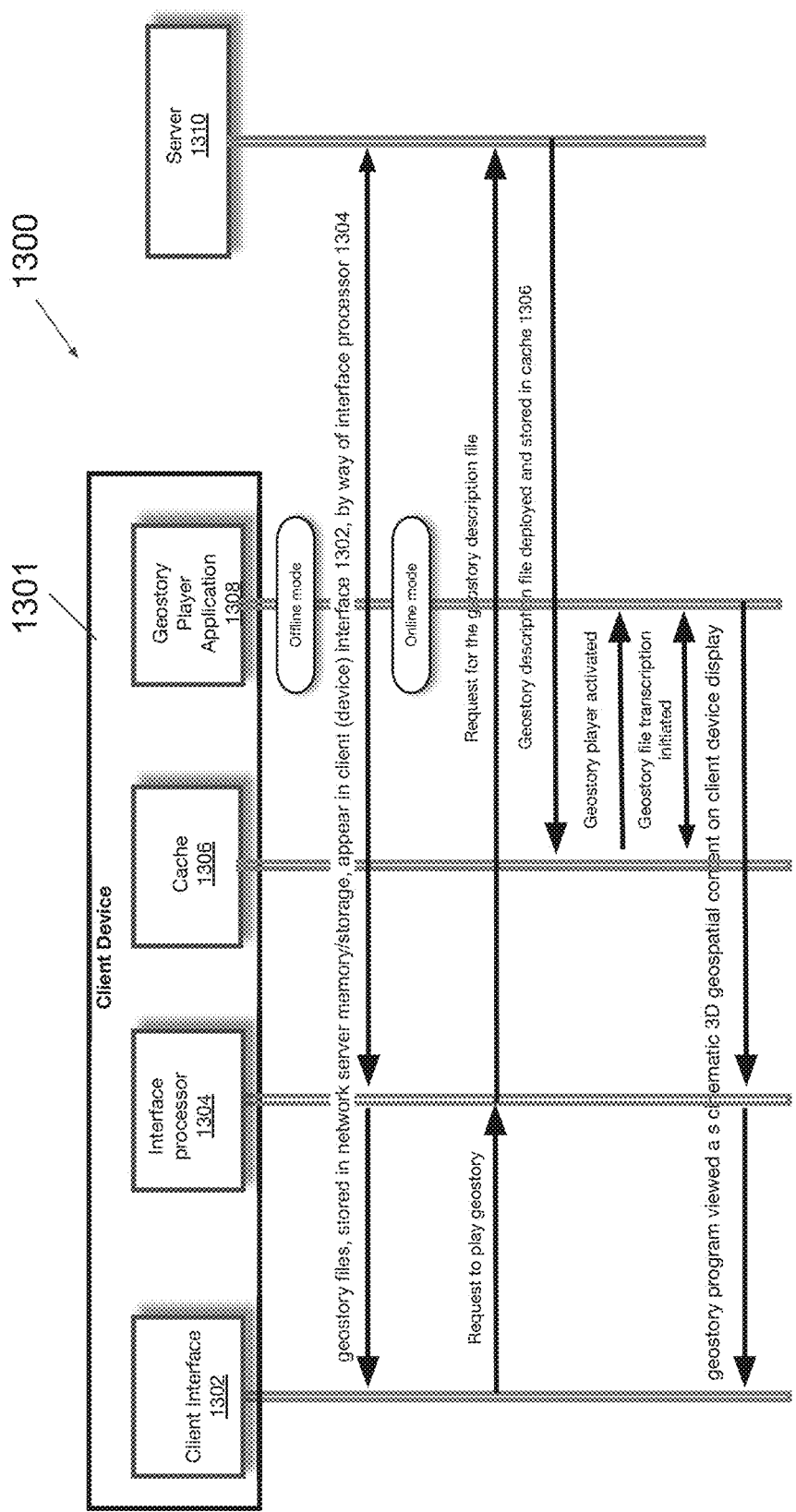
FIG. 16 shows a flow diagram of a geostory system 1300, in accordance with an exemplary implementation of the invention.

FIG. 16 shows a flow diagram of a geostory system 1300, in accordance with an exemplary implementation of the invention. In FIG. 16, the system 1300 creates a geostory by use of messages passed back-and-forth between a (network) server 1310 and a client device 1310. The client device 1301 is shown to include a client interface 1302, an interface processor 1304, cache 1306, and a geostory player application 1308, such as the system 24, shown in FIG. 1.

The flow of information initially shows the user being offline, with no network access, and therefore, unable to allow the client device 1301 to effectively execute the application 1308. The server 1310 detects the user becoming online by a mechanism worked out between the server 1310 and the client device 1301, such as the detection of a user's click of a button on the client device display, as an example.

Once online, the interface processor 1304 initiates and completes transfer of the geostory files, stored in the network server memory/storage, such as the database 41 of FIG. 1, from the network server 1310 to the client (device) interface 1302. In an exemplary embodiment of the invention, the geostory files are already in the client interface 1302 and need not be transferred from the network server 1310, Upon completion of the transfer of the geostory files to the client interface 1302, which is coupled to the display of the client device 1301, the client interface 1302 initiates making a request for playing a geostory to the processor 1304. The processor 1304 then requests to receive the geostory description file that corresponds to the geostory the client interface 1302 has requested to be played, of the network server 1310. Upon receipt of the request for the geostory description file, the network server 1310 retrieves the geostory description file, stored in, for example, the database 41 of FIG. 1, and deploys it to the cache 1306 of the client device 1301 for (temporary) storage therein. Next, cache 1306, upon receiving the geostory description file, activates the geostory player application 1308 and geostory file transcription is then initiated by the application 1308, and the geostory file corresponding to the requested geostory by the client interface 1302, is transferred to the client interface 1302 by the application 1308, under the direction of the processor 1304. Execution of the geostory program, by the interface 1302, causes the requested geostory to be played on the display of the client device 1301 (not shown in FIG. 16), presenting a cinematic 3D geospatial content (of the geostory) on the client device display.

Figure 17:
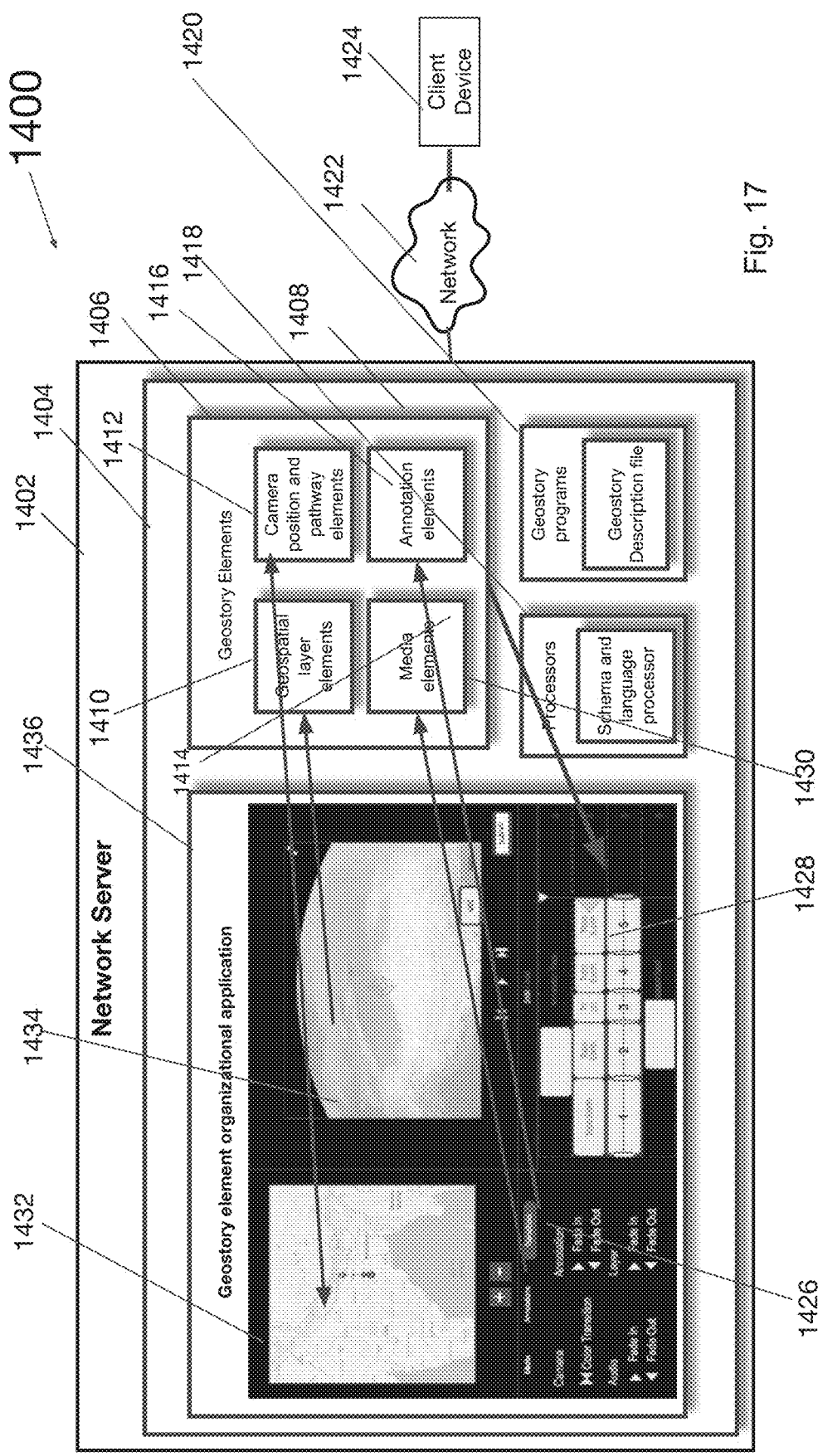
FIG. 17 shows an exemplary geostory system 1400, in according with an implementation of the invention.

FIG. 17 shows an exemplary geostory system 1400, in according with an implementation of the invention. The system 1400 is shown to include a network server 1402 and network 1422 and client device 1424. The network server 1402 is shown to include various components of the network server 1404, such as geostory elements 1406, processor 1418, and geostory programs 1420. The geostory (element) organizational application 1436, which is analogous to the system 18, is accessed through a network server 1422.

FIG. 17 shows an example of the various elements that can be displayed, as shown by application 1436. For example, the map 1432, displayed on the client device display is made of camera positions and pathway elements 1412 of the network server 1402. Similarly, the partial globe, shown at 1434 is made of (map) layer elements 1410 and the information shown at 1426 is from the media elements 1414. The annotations elements 1416 make up the annotations at 1428. The geostory elements are modified in those panels, (Panels A, B, C) and then the geostory elements are saved in a database, such as the databases 12, in FIG. 1. Thereafter they are added to the geostory organizational schema (Panel D).

The processors 1418 generates the geostory organizational schema and the geostory description language, which is used, along with the geostory organizational schema, to generate the geostory program, stored at the geostory programs 1412.

The user of the client device 1424 accesses a tool, through a network 1422, to build a geostory from the various geostory elements 1406. The client device 1424 and the network server 1402 communicate with each other through the network 1422

Figure 18:
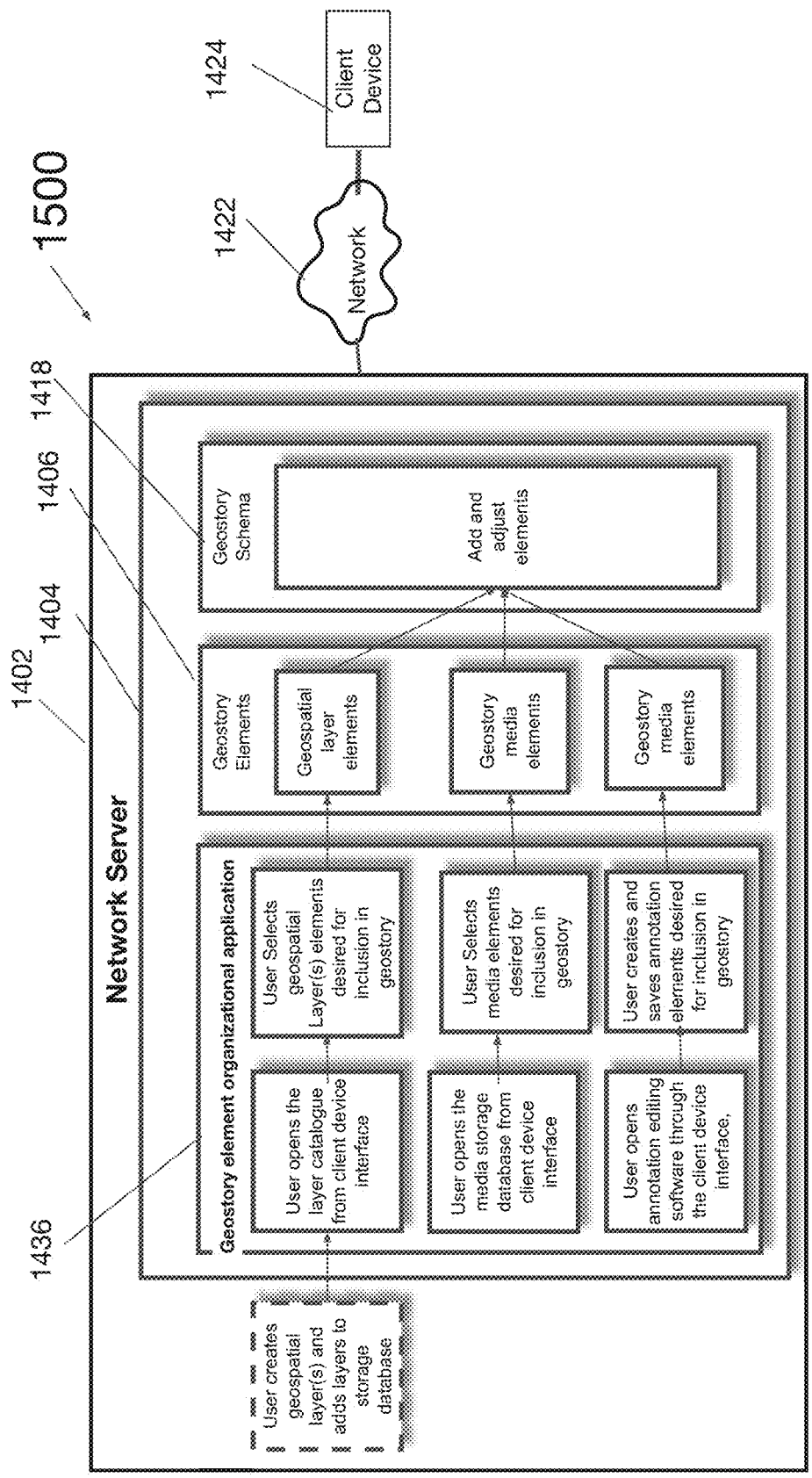
FIG. 18 shows a geostory system 1500, analogous to the system 800, for adding and modifying geostory elements, in accordance with an exemplary implementation of the invention.

FIG. 18 shows a geostory system 1500, analogous to the system 800, for adding and modifying geostory elements, in accordance with an exemplary implementation of the invention. The system 1500 is shown to employ many of the components of the system 1400 the process for adding and modifying geostory elements from a user's perspective. The user initially creates geospatial layer(s) and adds the generated layers to a storage database, such as the database 40, in FIG. 1. Next, the user may access a layer catalogue, a media storage database, such as the database 42, in FIG. 1 and/or access the annotation editing software through the client device interface.

Depending on which type of content the user is interested in adding to the geostory the user is building, the layer catalogue, media content, and annotation editing software, or a combination thereof, may be used to build the geostory. Based on this selection, corresponding elements are accessed, such as the geospatial layer(s) element, media element, and/or annotation element. It is understood that more than one type of element may be used to build the geostory. These elements are the geostory elements 1406 and the selected elements 1406 are ultimately used to create a geostory organizational schema 1418. That is, as each element from the geostory elements 1406 is selected, it is added to the schema 18 and the elements may be edited.

Figure 19:
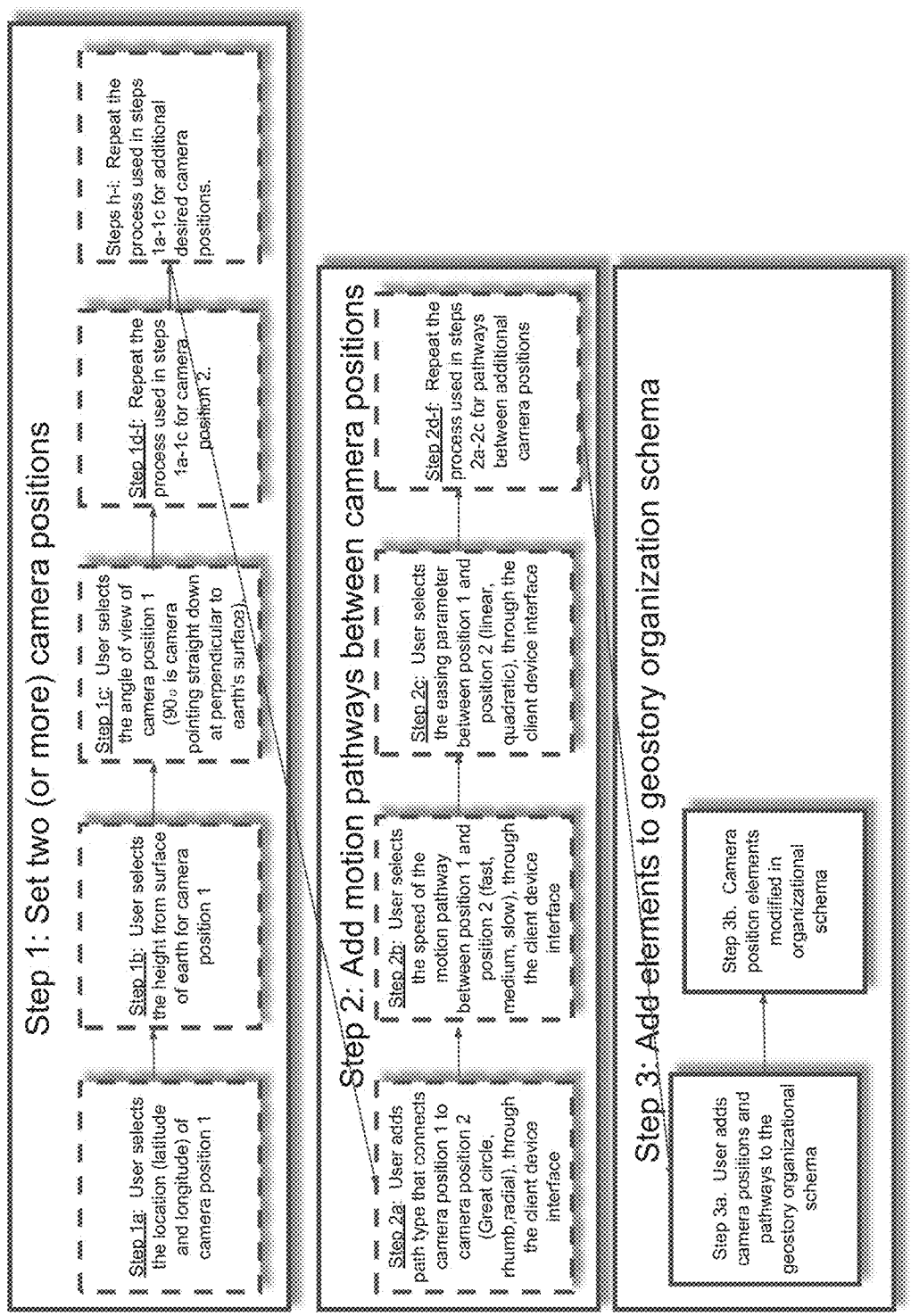
FIG. 19 shows a system 1600, analogous to the system 1500, but for the adding and modifying of geostory camera pathway elements.

FIG. 19 shows a system 1600, analogous to the system 1500, but for the adding and modifying of geostory camera pathway elements. The process starts, at step 1, where, at step 1*a*, the user selects a camera location, i.e. latitude and longitude, of the camera position 1 (on a globe presented on the client device display to the user). Next, at step 1*b*, the user selects the height from a surface of earth, on the globe, where camera position 1 is located. At step 1*c*, the user selects the angle of view of camera position 1 keeping in mind that an angle of view of 90 degrees points down, at a perpendicular angle, to the earth's surface. Next, at steps 1*d*-1*f*, processes 1*a* through 1*c* are repeated for camera position 2. If there are more than two camera positions to identify, at steps h-i, the steps 1*a*-1*c* are repeated as many time as there are additional camera positions to identify the latitude, longitude, height and angle of view for each camera position.

Next, at step 2, step 2*a* is performed where the user, through the client device interface, adds a path type of a pathway that connects all camera positions together. The path type designates the shape that the pathway takes, such as, without limitation, circle, rhumb, and radial. Next, at step 2*b*, the user selects the speed of the motion of the pathway between the selected camera positions. That is, the speed of the motion can be selected among varying speeds, such as fast, medium, and slow. This rate dictates how fast the pathway is drawn on the globe. Next, at step 2*c*, the user selects the easing parameter of the pathway between the camera positions, such as, without limitation, linear or quadratic. The easy parameter defines how the pathway, at the camera positions, ease into the position. Next, at steps 2*d*-2*f*, steps 2*a*-2*c* are repeated for each additional pathway, in case more than one pathway is selected by the user.

Next, at step 3, and more specifically, step 3*a*, the user adds the selected camera positions, of the previous steps, through the client device display, to the geostory organization schema. And, at step 3*b*, the camera position elements are automatically modified in the geostory organizational schema due to the addition of the camera positions and pathways in step 3*a*.

FIGS. 20-24 show various examples of the client device display, based on the user's selections of geostory elements, in exemplary implementations of the invention.

Figure 20:
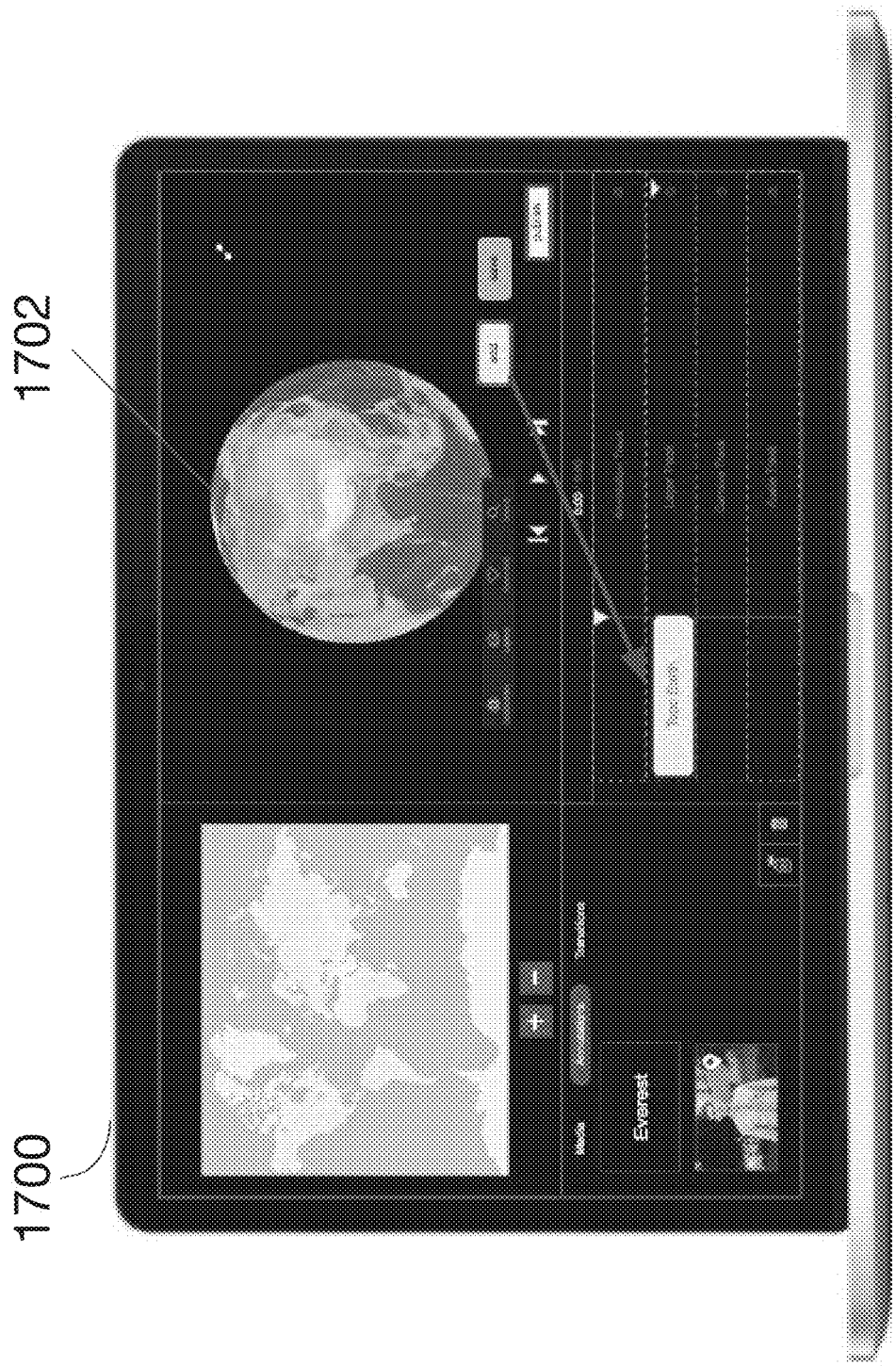
FIGS. 20-24 show various examples of the client device display, based on the user's selections of geostory elements, in exemplary implementations of the invention.

Upon selection and addition of (map) layers, in FIG. 20, from the network server and using the client device, the added layers become a part of the geostory organizational schema that is ultimately translated into a geostory description language that ultimately forms the geostory presented viewed on a client device, such as the display of a laptop, smartphone, desktop, and the like. The geostory, as played, presents the geostory elements contents in 3D, with for example, the globe spinning, something that cannot be shown in a two-dimensional picture, such as shown in FIGS. 20-24. The user can stop a geostory that is currently playing, alter the geostory elements to modify the geostory, and resume playing the geostory with the modified content. Or, the user can start all over with creating an entirely new geostory. The panels shown in each of the displays in FIGS. 20-24 offer a toolbox of tools, available to the user, for creating and/or modifying a geostory. For example, to add audio, such as a narration or music, to a geostory, the user merely clicks and selects the audio file from the media contents panel on the screen and drags it to where the geostory description file is being formed, which is Panel D, in the screens shown in FIGS. 20-24. As a user adds geostory elements in the geostory organizational schema, the geostory description language is updated, on-the-fly. An analogy might be the use of Google Documents ("Google Docs") where edits to a document are done in real time and the associated document is automatically saves in real time. The user can see the changes in near real time on the client device, as the user is making the changes. Thus, the user can see his/her work as the user adds elements. Moreover, the user can see his/her work as the user is editing geostory elements. The geostory description file automatically updates as the user modifies the geostory organization schema (the geostory elements' properties). For example, a (map) layer may be added to the geostory organizational schema, as specified for the last 30 seconds of a geostory. The geostory description file adds the map layer file for 30 seconds in the geostory description language. The duration can be adjusted from 30 seconds to be 45 seconds to fit a geostory need, the geostory description language automatically adjust the geostory to 45 seconds. A user can create a geostory and not watch it or watch a geostory without having created it or both. Geostories may be created by others.

Figure 21:
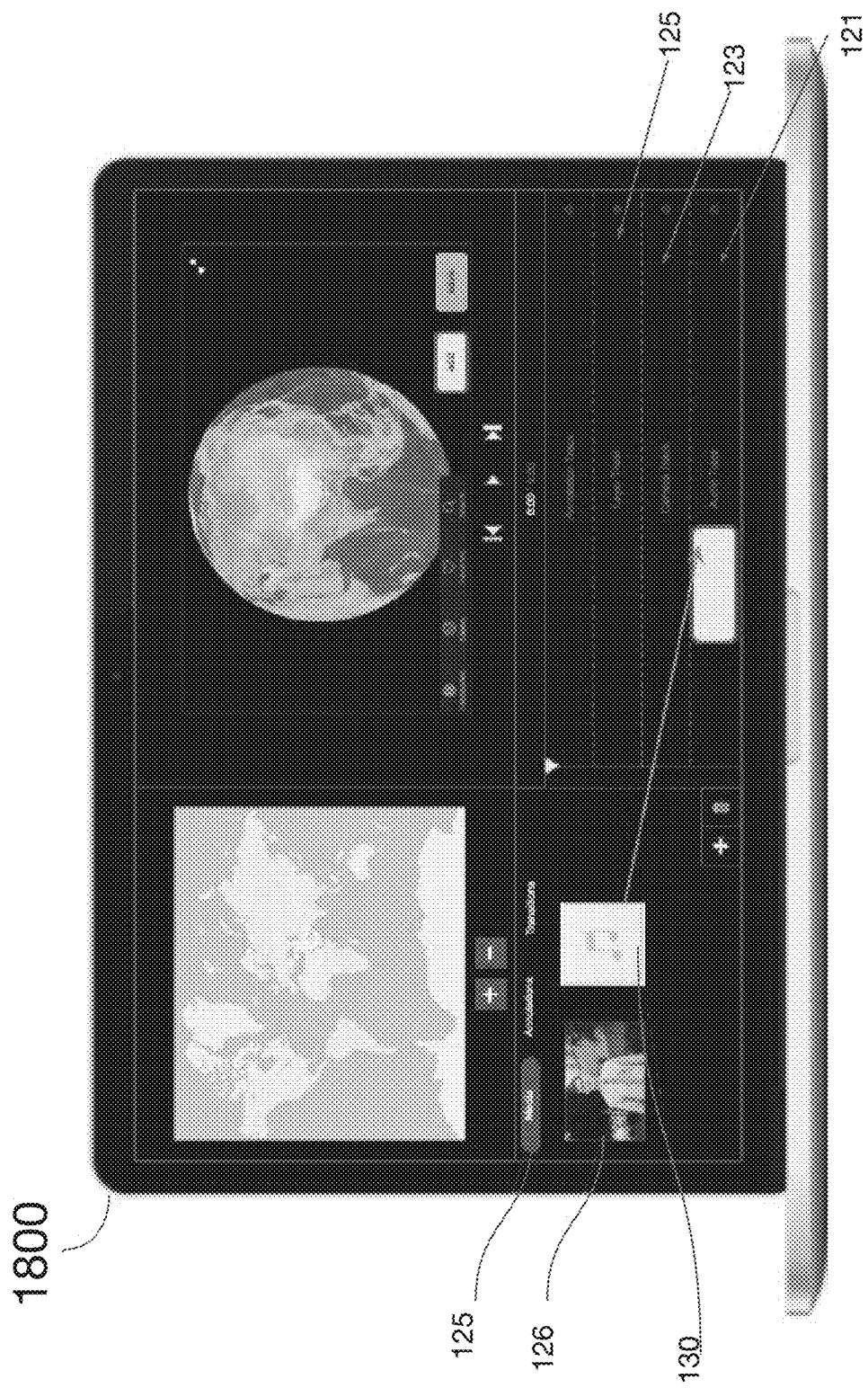

FIG. 21 shows an example retrieving and adding media (content) elements, such as audio, video, image, and static images, through the network server, into a geostory organizational schema that is translated into a geostory description language. In the display 1800, the media elements are translated to the image 126 and audio 130. These media elements are shown visually, as can be seen at 126 and 130, in a media box folder, in the display 1800 by clicking and dragging over these elements to their corresponding tracks. "Track", as used herein, refers to an area, in a panel of the display, such as Panel D, discussed above, where a geostory element is added into by a process of clicking and dragging that file using a mouse device or the like into a designated space or "Track" designated for that file type (e.g. music audio element added into a music audio "Track". In FIG. 21, the audio track is shown at 121, the camera track is shown at 123, the (map) layer track is shown at 125. All audio elements are dropped in the audio track, at 121, all camera position pathways go into camera track 123, and so forth. When a geostory element is placed into a track, the geostory organizational schema knows to identify that geostory element by its track no. (e.g. audio as an audio media element), and the track no. is added to the geostory description file, as such. Additionally, tracks are read left to right, in an exemplary embodiment of the invention. Because there is a time bar associated with tracks, the geostory system knows when to add the geostory element into the geostory description language. It is understood that tracks can be read from right-to-left or otherwise.

Figure 22:
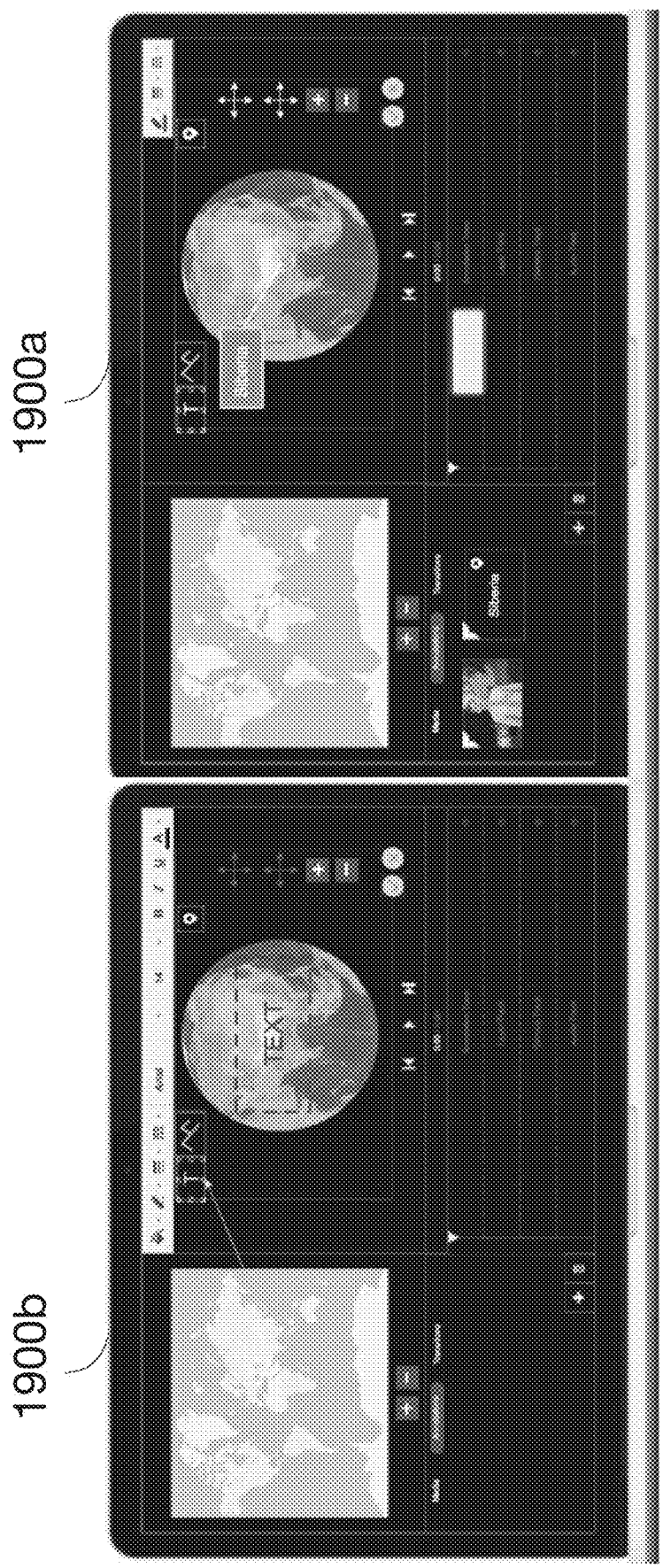

FIG. 22 shows an example of using annotation elements. The display 1900*a* shows the display prior to the addition of the annotation elements and display 1900*b* shows the display after the annotation elements have been added, which in this example is the term "TEXT" encompassed in a dashed rectangle.

Figure 23:
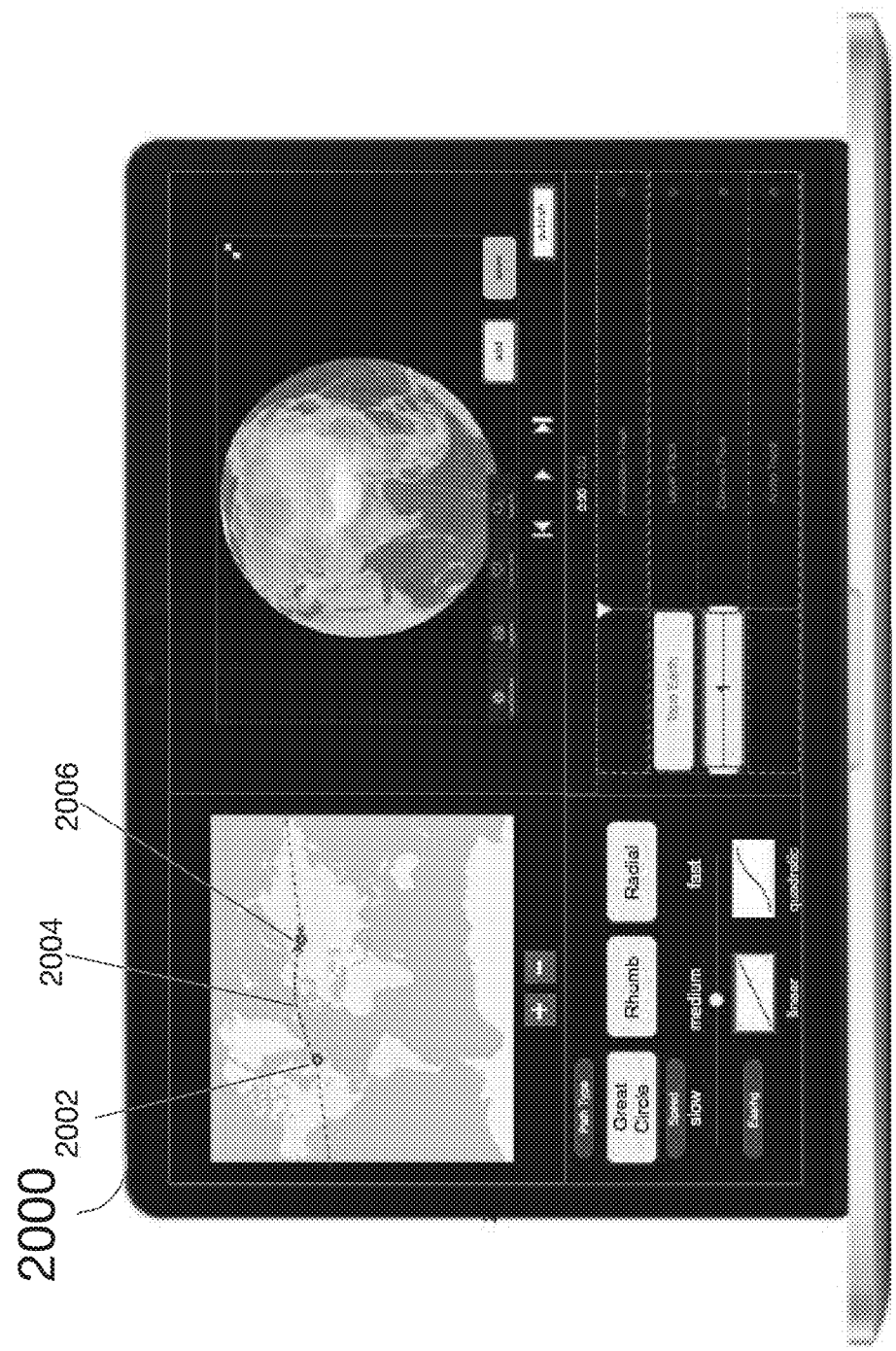

FIG. 23 shows the display 2000, which shows an example of creating camera positions at camera position 2002 and camera position 2004, and other camera positions, perhaps. A camera pathway 2006 is created connecting the camera positions 2002 and 2004. The geostory system, such as the system 10 of FIG. 1, automatically adds the camera track and allows the user to adjust the parameters of the camera pathway. Therefore, the camera positions 2002 and 2004 and pathway 2006 are added as elements into the geostory organization schema.

Figure 24:
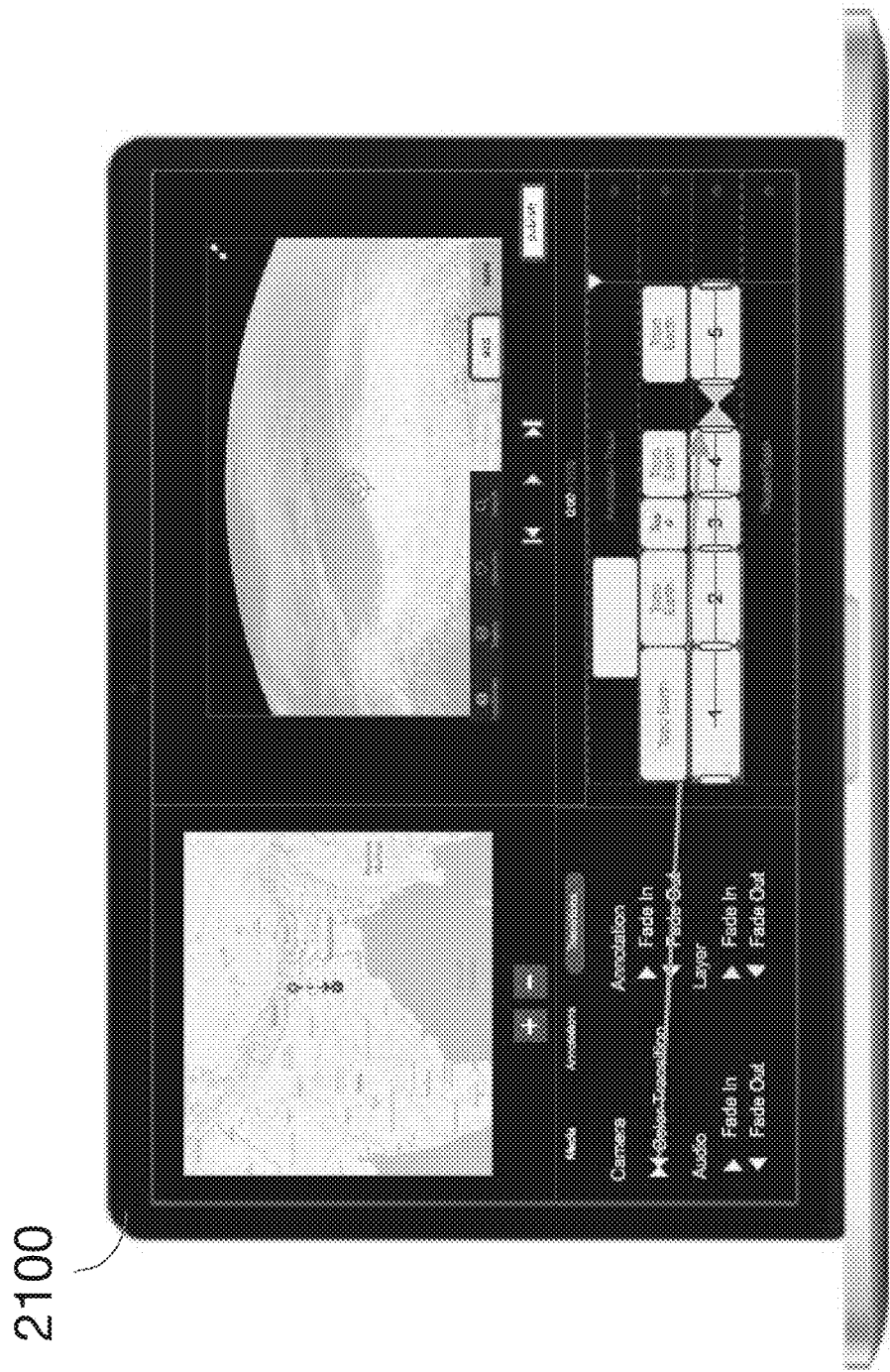

FIG. 24 shows an example of adjusting the geostory elements, such as time, transition period, color transition, fading properties, among others, into an geostory organization schema that is ultimately translated into a geostory description language.

Figure 25:
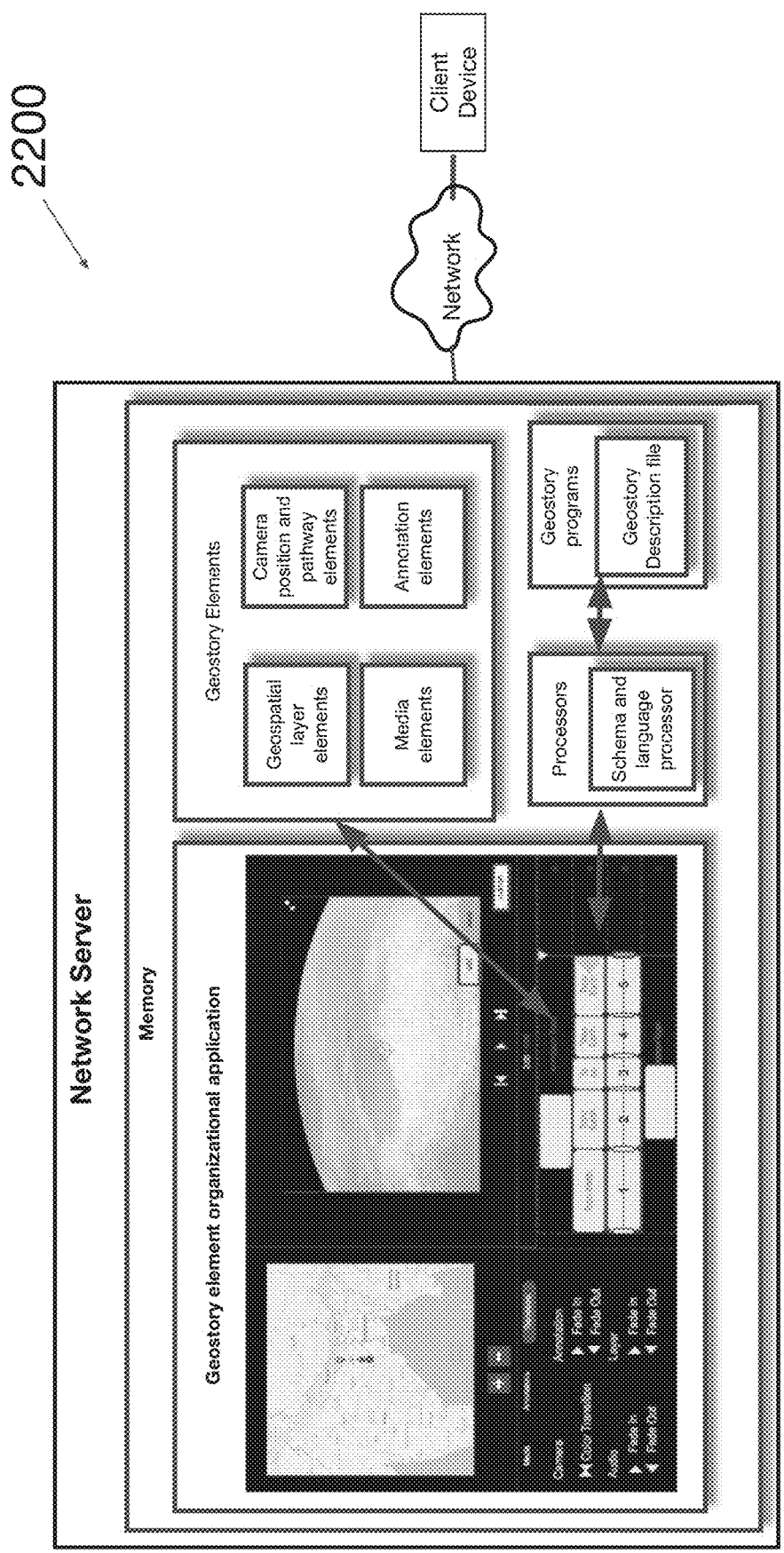
FIG. 25 shows another example of the correlation between the information in the geostory element organization application, as depicted in a client device display, and the geostory elements and description language and organizational schema in the network server.

FIG. 25 shows another example of the correlation between the information in the geostory element organization application, as depicted in a client device display, and the geostory elements and description language and organizational schema in the network server.

Figure 26:
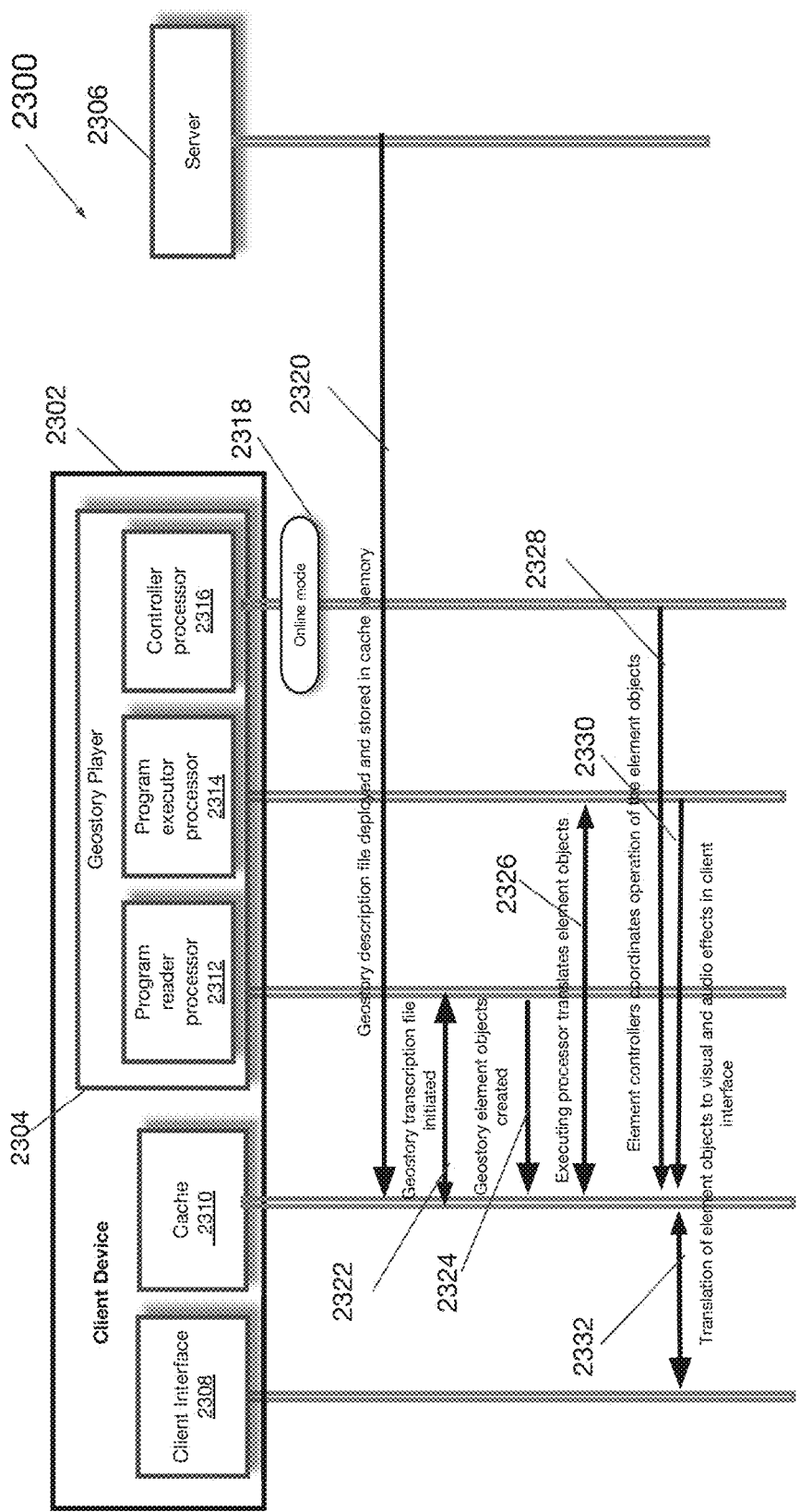
FIG. 26 shows an exemplary flow process for generating element controllers and element objects of a geostory description file.

FIG. 26 shows an exemplary flow process for generating element controllers and element objects of a geostory description file. The element controllers and element objects signify certain information relating to the information in the geostory description files, such as the separation of the various elements. For example, where an element begins and where it ends and its duration.

The geostory system 2300 is shown to include a client device 2302 and server 2306. While not shown in FIG. 26, it is understood that the client device 2302 and server 2306 communicate together via some sort of network, as previously discussed. The client device is shown to include a geostory player 2304, client interface 2308 and cache 2310. Geostory player 2304 is shown to include a program reader processor 2312, a program executor processor 2314, and a controller processor 2316. The geostory player 2304 is analogous to the system 24 and the client device 2302 is analogous to the client device 28, in FIG. 1.

FIG. 26 shows the flow of information/messages between the (network) server 2306 and the client device 2302 for incorporating (geostory) element objects and element controllers in the geostory description file.

At 2318, the client device 2302 is in an 'online' mode and in communication with the server 2306 through a network. At 2320, the server 2306 deploys the geostory description file to the client device 2302, to be stored in cache 2310 thereof. It is noteworthy that the geostory description file does not include the actual content of the geostory elements or the elements themselves, in an exemplary embodiment of the invention although in other embodiments, it may. In embodiments, such as the one depicted in FIG. 26, where the geostory description file does not include geostory elements, system performance is improved because less information is transmitted to the client device 2302, from the server 2306 and less real estate is required, in cache 2310 or any other type of memory used for saving the geostory description file.

In the embodiment of FIG. 26, where the geostory description file does not include the geostory elements, the geostory description file includes information relating to the geostory elements, such as where a geostory element starts and when it ends, the type of the geostory elements, and the like. At 2322, in FIG. 26, initiation of (geostory) element objects is done by the program reader processor 2312, of the geostory player 2304, to be performed on the geostory description file.

At 2324, the (geostory) element objects are created, by the processor 2312, on the geostory description file, saved in cache 2310. The program reading processor contains description code that provides the instruction for creating geostory element objects upon translation of the geostory description file. The program reading processor also provides the instruction for the saving of the geostory elements into cache memory. Separately, the geostory program executing engine, contains the description code that contains controllers and the provides the instruction for the guidance and function of controllers. These controllers are contained in the geostory program executing engine independent of the translation process.

Next, at 2326, the processor 2314 translates the element objects in the geostory description file (saved in cache 2310). The geostory program reading processor 2312 contains description code that provides the instruction for translation of the geostory description file. This code instructs the processor to open and read the configuration file, as well as to create geostory element objects. Translation describes the process of reading the configuration file and creating object elements in parallel and sequence to the description of the geostory elements contained in the file. The created element objects are stored in the allocated block of memory 2310. Next, 2328 and 2330, the element controllers, created and directed according to the code of the processor 2316, work in conjunction with element objects to translate the element objects stored in cache memory on the client device 2310. The translated element objects result in visual and audio effects 2332 to be displayed on the client device display (examples of which are shown in FIGS. 20-24), by the interface 2308.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description.

In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

The invention claimed is:

1. A method in a geostory system comprising:
   upon creation of one or more geostory elements for a geostory, a geostory engine system retrieving one or more geostory elements from one or more corresponding geostory databases, the one or more geostory elements defining, at least in part, a geostory program, each of the one or more geostory elements having an associated description;
   a geosystem organization system assembling, with an organization, the retrieved one or more geostory elements into a geostory organizational schema, the geostory organizational schema defining a sequence and order of distinct types of potentially overlapping geostory elements and the sequence defining an order in which the one or more geostory elements are executed when playing the geostory; and
   while assembling the retrieved one or more geostory elements into the geostory organizational schema, automatically translating the assembled one or more geostory elements and adding the translated one or more geostory elements to a geostory description language to generate the geostory program.

2. The method of claim 1, further including modifying the geostory description language by reorganizing, removing, or adding to, one of the one or more retrieved geostory elements of the geostory organizational schema to form a modified geostory program that when executed plays a modified geostory.

3. The method of claim 1, further including using a geostory element editor, editing one or more of the retrieved one or more geostory elements to play a modified geostory.

4. The method of claim 1, wherein the retrieved one or more geostory elements include one or more layers element; one or more media element, one or more annotations element, and one or more camera pathway element, or a combination thereof.

5. The method of claim 4, wherein the one or more layers element includes map layers, the one or more media element includes video content, audio content, or a combination thereof, the one or more annotations element includes annotations to the retrieved one or more geostory elements, and the one or more camera pathway element includes at least two camera positions that define a pathway on a client device display of an area of interest.

6. The method of claim 1, wherein the geospatial description language includes information related to geostory elements and as additional one or more geostory elements are selecting, adding information relating to the additional one or more geostory elements to the geospatial description language until all geostory elements of the geostory are added.

7. The method of claim 6, further including transmitting the geostory program, through a network, to a client device, upon detection of an interest by a user of the client device.

8. The method of claim 1, further including causing a selection of geostory element content on a display, wherein a toolbox of various types of geostory element content is presented for a user to choose to build a geostory.

9. The method of claim 1, wherein the retrieved one or more geostory elements are generated by a user client device or a third party device.

10. A method in a geostory system comprising:
    upon receiving a request for transmission from a client device, deploying a geostory program to effect cinematic geospatial content on the client device, wherein element objects are created and which work with controllers, in sequence, and in parallel relative to one or more geostory elements described in a geostory description language, in the geostory program, wherein the geostory description language conveys a geostory organizational schema;
    using a geostory player, translating and transcribing, by a processor of a client device, wherein the element objects work in concert with the element controllers to locate and execute one or more geostory elements;
    reading, by a geostory program reading engine, contents of the one or more geostory elements; and
    transmitting to the client device, by a geostory deployment processor, the read contents, the transmitted contents affecting visual and audio systems to execute geospatial cinematic content.

11. The method of claim 10, wherein the modifying step is performed by a geostory element engine corresponding to the geostory element being edited.

12. The method of claim 10, wherein the retrieved one or more geostory elements include one or more layers element, one or more media element, one or more annotations element, and one or more camera pathway element, or a combination thereof.

13. The method of claim 10, wherein the one or more geostory elements includes one or more layers, media, annotations, and camera pathways.

14. A method in a geostory system comprising:
    upon receiving a request for transmission from a client device, a geostory deployment processor deploying a geostory program to effect cinematic geospatial content on the client device, wherein element objects and element controllers are created in sequence and in parallel relative to one or more geostory elements described in a geostory description language, in the geostory program, wherein the geostory description language conveys a geostory organizational schema;
    using a geostory player, translating and transcribing, by a computer system, wherein the element objects work in concert with the element controllers to locate and execute the one or more geostory elements;
    reading, by a geostory program reading engine, contents of the one or more geostory elements; and transmitting to the client device, by a computer system, the read contents, the transmitted contents affecting visual and audio systems to execute geospatial cinematic content.

15. The method of claim 14, further including using a geostory element editor, editing one or more of the retrieved one or more geostory elements to play a modified geostory.

16. The method of claim 14, wherein the retrieved one or more geostory elements include one or more layers element, one or more media element, one or more annotations element, and one or more camera pathway element, or a combination thereof.

17. The method of claim 14, wherein the one or more layers element includes map layers, the one or more media element includes video content, audio content, or a combination thereof, the one or more annotations element includes annotations to the retrieved one or more geostory elements, and the one or more camera pathway element includes at least two camera positions that define a pathway on a client device display of an area of interest.

18. The method of claim 14 one or more geostory elements, wherein the geospatial description language includes information related to geostory elements and as additional one or more geostory elements are selecting, adding information relating to the additional one or more geostory elements to the geospatial description language until all geostory elements of the geostory are added.

19. The method of claim 14, further including transmitting the geostory program, through a network, to a client device, upon detection of an interest by a user of the client device.

20. The method of claim 14, further including causing a selection of geostory element content on a display, wherein a toolbox of various types of geostory element content is presented for a user to choose to build a geostory.

* * * * *